United States Patent
Kartawira et al.

(10) Patent No.: US 12,028,660 B2
(45) Date of Patent: Jul. 2, 2024

(54) CASCADED OPTICAL SWITCH

(71) Applicant: Equinix, Inc., Redwood City, CA (US)

(72) Inventors: Iwan Kartawira, San Jose, CA (US);
Balakrishnan Sridhar, Ellicott City, MD (US); Manveer Singh, Tracy, CA (US); Qiang Wang, San Carlos, CA (US); Mohan Rao G. Lingampalli, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 11 days.

(21) Appl. No.: 17/819,797

(22) Filed: Aug. 15, 2022

(65) Prior Publication Data
US 2024/0056704 A1 Feb. 15, 2024

(51) Int. Cl.
*H04J 14/00* (2006.01)
*G02B 6/35* (2006.01)
*H04Q 11/00* (2006.01)

(52) U.S. Cl.
CPC ......... *H04Q 11/0005* (2013.01); *G02B 6/356* (2013.01); *H04Q 2011/0016* (2013.01);
(Continued)

(58) Field of Classification Search
CPC ........... H04Q 11/0005; H04Q 11/0062; H04Q 11/0066; H04Q 11/0067; H04Q 11/0003;
(Continued)

(56) References Cited

U.S. PATENT DOCUMENTS 8,068,715 B2   11/2011   Kewitsch
8,428,071 B2 * 4/2013   Beshai .............. H04Q 11/0005
                                                                370/400
(Continued)

FOREIGN PATENT DOCUMENTS

WO   2016070145 A1   5/2016
WO   2016168577 A1   10/2016
(Continued)

OTHER PUBLICATIONS

Kaneko et al., "Automated large-scale fiber cross-connecting switch using a fiber handling method", Optical Fiber Communication Conference Technical Digest, vol. 2, Feb. 22, 1998, pp. 170-171.
(Continued)

*Primary Examiner* — Hanh Phan
(74) *Attorney, Agent, or Firm* — Shumaker & Sieffert, P.A.

(57) ABSTRACT

An example cascaded optical switch includes: a fast optical switch and a slow optical switch both having input ports and output ports. A switching time of the slow switch is longer than a switching time of the fast optical switch. The cascaded optical switch includes a first pre-cabled optical fiber connecting an output port of the slow optical switch to an input ports of the fast optical switch, and a second pre-cabled optical fiber connecting an output ports of the fast optical switch to an input ports of the slow optical switch. The fast optical switch or the slow optical switch is configured to receive configuration data to modify a switching configuration to configure a fiber cross-connect in the optical switch fabric that includes at least one of the first pre-cabled optical fiber or the second pre-cabled optical fiber.

20 Claims, 8 Drawing Sheets

(52) U.S. Cl.
CPC ............... *H04Q 2011/0024* (2013.01); *H04Q 2011/0039* (2013.01); *H04Q 2011/0052* (2013.01)

(58) Field of Classification Search
CPC ..... H04B 10/032; H04B 10/035; H04J 14/02; H04J 14/0278; G02B 6/356; G02B 6/4452; G02B 6/3897
USPC ........ 398/45, 46, 47, 48, 49, 50, 51, 52, 53, 398/54, 55, 56, 57, 79, 2, 3, 4, 5, 7, 8, 398/33, 38; 385/24, 16, 17, 18, 135, 136, 385/147; 370/400, 386, 360, 376, 216, 370/217, 225, 228
See application file for complete search history.

(56) References Cited

U.S. PATENT DOCUMENTS

| | | | |
|---|---|---|---|
| 9,712,435 | B2 | 7/2017 | Teng et al. |
| 9,736,556 | B2 | 8/2017 | Lingampalli |
| 9,886,267 | B2 | 2/2018 | Maheshwari et al. |
| 9,887,876 | B2 | 2/2018 | Kumar et al. |
| 9,948,552 | B2 | 4/2018 | Teng et al. |
| 9,967,350 | B2 | 5/2018 | Rao |
| 10,021,197 | B2 | 6/2018 | Rao |
| 10,015,268 | B2 | 7/2018 | Rao |
| 10,027,768 | B2 | 7/2018 | Rao |
| 10,116,499 | B2 | 10/2018 | Kumar et al. |
| 10,129,078 | B2 | 11/2018 | Kumar et al. |
| 10,206,017 | B2 | 2/2019 | Lingampalli |
| 10,230,571 | B2 | 3/2019 | Rangasmy et al. |
| 10,237,355 | B2 | 3/2019 | Rao |
| 10,250,699 | B2 | 4/2019 | Rao |
| 10,291,726 | B2 | 5/2019 | Rao |
| 10,491,462 | B1 | 11/2019 | Wagner et al. |
| 10,757,489 | B2 | 8/2020 | Menard et al. |
| 10,764,126 | B2 | 9/2020 | Kumar et al. |
| 11,070,896 | B1 | 7/2021 | Clark et al. |
| 11,218,363 | B2 | 1/2022 | Kumar et al. |
| 2014/0321853 | A1* | 10/2014 | Beshai ................ H04J 14/0284 398/52 |
| 2022/0131744 | A1 | 4/2022 | Kumar et al. |

FOREIGN PATENT DOCUMENTS

| | | |
|---|---|---|
| WO | 2016183253 A1 | 11/2016 |
| WO | 2017044405 A1 | 3/2017 |

OTHER PUBLICATIONS

Mizukami et al., "200×200 automated optical fiber cross-connect equipment using a fiber-handling robot for optical cabling systems", Optical Fiber Communication Conference, Optical Society of America, Mar. 6, 2005, 3 pp.

U.S. Appl. No. 17/647,862, filed Jan. 13, 2022, naming inventors Sridhar et al.

International Search Report and Written Opinion of International Application No. PCT/US2023/030270 dated Nov. 14, 2023, 12 pp.

\* cited by examiner

CASCADED OPTICAL SWITCH

TECHNICAL FIELD

The invention relates to computer networks and, more specifically, to interconnecting computer networks.

BACKGROUND

A network services exchange provider or co-location provider (a "provider") may employ a communication facility, such as a data center or warehouse, in which multiple customers of the provider locate network, server, and storage gear and interconnect to a variety of telecommunications and other network service provider(s) with a minimum of cost and complexity. Data centers may be shared by the multiple tenants locating networking equipment within the data centers. With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some cases, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "co-location facility."

One example of interconnection between different networks within an interconnection facility is a physical cross-connect, in which the provider manually installs a physical cable (such as a CAT5/6, coax, or optical fiber cable) that then provides a physical (e.g., "layer 0") connection between the customer networks for inter-customer interconnections (between different customers) or intra-customer interconnections (between areas of an interconnection center(s) that are operated/leased by a single customer). As noted above, optical fiber cabling infrastructure is typically manually installed by the provider between customer spaces, with end-to-end or "home run"/"direct attach" optical fiber cabling between endpoints of an optical fiber cross-connect. In some cases, the provider uses structured cabling in the form of intermediate manual fiber patch panels in distribution facilities controlled by the provider that allow the cross-connect to take advantage of shared/trunked fiber cabling between distribution facilities. In many cases, optical fibers between distribution facilities are also manually installed per-cross-connect.

Due in part to significant growth in Internet traffic and services, fiber infrastructure in many communication facilities has become heavily overloaded to the point of exceeding the maximum infrastructure capacity available for physically carrying optical fibers, such as overhead fiber trays. An overloaded communication facility hinders additional fiber cross-connect needed to keep pace with the increasing client equipment fiber port densities required to support ever-increasing bandwidths and new generations of fiber rich networking equipment with high densities of client interfaces.

In addition, installing a new fiber cross-connect across the floor of an interconnection facility, between floors, across campuses, and across distributed interconnection facilities within a metropolitan area (or "metro") often requires several man days of work to determine infrastructure availability and to determine an available physical path through the various distribution facilities within the interconnection facilities. As noted above, a fiber cross-connect typically requires running home run fiber between the fiber cross-connect end points located at the respective demarcation points of customer spaces. Depending on the service, multiple patch panel connections are required in addition to one or more optical fiber runs creating several segments from a customer space in a data center to another customer space in a different data center geographically located elsewhere in a metropolitan area, for instance.

Every fiber connection is typically manually designed for specific cable routing and often with field termination of fiber end points. However, when customers disconnect a cross-connect after some time of operation, this may trigger operational issues. For example, when customers request disconnection of a fiber cross-connect service, provider technicians mine out optical fiber cables between the cross-connect end points by physically removing them from the overhead fiber trays. When mining out optical fiber cables for a disconnects, other cables carrying live traffic for other customers may be inadvertently broken, thus potentially violating service level agreements (SLAs) with the other customers and potentially resulting in SLA penalties to the provider.

SUMMARY

In general, techniques are described for a cascaded optical switch, which may be used to support fiber cross-connect automation solutions. The cascaded optical switch includes a fast-switching, small port density switch ("fast switch") that is pre-cabled to and/or encapsulated within a slow-switching, large port density switch ("slow switch"). For example, output ports of the slow switch may be pre-cabled to input ports of the fast switch, and output ports of the fast switch may be pre-cabled to the input ports of the slow switch. Being a combination of a fast switch and a slow switch, the cascaded optical switch may in effect offer a multi-stage Clos optical switching fabric, with the fast switch acting as the middle stage.

The cascaded optical switch may be deployed as part of an optical switch fabric to support fiber cross-connects between networks co-located within a data center (or in multiple, geographically distributed data centers connected via optical fibers). The optical switch fabric may be pre-cabled to connect ports of the cascaded optical switch to customer networks, directly or via patch panels.

The techniques may provide one or more technical advantages that realize at least one practical application. For example, unlike a static fiber cross-connect and also unlike a dynamic fiber cross-connect that uses an optical switch to dynamically modify the fiber connections between customer networks, the cascaded optical switch supports a more dynamic and optimized optical switch fabric that can address multiple different goals of the provider and data center tenants/customers to meet differing customer needs with regard to SLAs in large to hyperscale data centers that present many hundreds or thousands of connection opportunities.

For instance, because the cascaded optical switch includes both a configurable fast optical switch and a configurable slow optical switch, the fiber cross connect provider (hereinafter, "interconnection provider") may offer a variety of SLAs to meet a variety of purposes/use cases. The slow optical switch has a high port count and can offer connectivity to many more other networks than a fast optical switch alone, but the slow optical switch alone may be unable to address use cases that require shorter switching times, such as for failover/redundancy or quicker interconnections. In addition, the interconnection provider can offer multiple SLAs, and can offer the ability to change between service levels, e.g., to change the SLA. For example, the interconnection provider may offer a first level of service that meets a first SLA may guarantee a customer's interconnection order will be completed in 24 hours or less for which the provider may reconfigure the slow switch fabric. The interconnection provider may offer a second level of service that meets a second SLA may guarantee a customer's interconnection order will be completed in 30 minutes or less for which the interconnection provider may use the fast switch. The interconnection provider may further offer to allow customers to change their level of service. In response to a change of service request, the interconnection provider may utilize multiple switch technologies, e.g., via integrating one or more fast optical switches within a slow optical switch. As a result, the cascaded optical switch will enable the optical switch fabric to be highly optimized, flexible, and adaptable to customer demands.

In some examples, an optical switch fabric including the cascaded optical switch may provide a mechanism for creating a multi-stage architecture made of large port-count slow optical switches and relatively smaller port-count fast optical switches to provide automation for configuring fiber cross connects in the optical switch fabric. An optical switch fabric including the cascaded optical switch may provide a mechanism that encapsulates one or more relatively smaller port-count fast optical switches with a large port-count slow optical switch to prevent stranded capacity in the one or more fast optical switches. An optical switch fabric including the cascaded optical switch may provide a mechanism to scale the size of the fast optical switch by adding more fast optical switches as needed, to de-centralize and distribute the fast optical switch to de-focus from finding a fast optical switch with the highest switch density, to scale the size of the fast optical switch independent of its technology (e.g., mechanical, robotic, optical), and to increase the availability of service by allowing the fiber cross connect service to be moved to, or configured to include, different types of switches (e.g., slow or fast) when there is a port or switch failure. In some examples, an optical switch fabric including the cascaded optical switch may provide a mechanism to permanently reserve and/or pre-provision and/or pre-assign specific customer ports directly to the fast optical switch via the slow optical switch prior to a customer order (e.g., to ensure a <30 min SLA), to optimize end-to-end (e.g., "A" to "Z") insertion loss in the cascaded/mixed slow and fast optical switch architecture for SLA <30 min (e.g., relative to a cascaded all fast optical switch architecture), to enable automation of the optimization of fast optical switch port utilization (e.g., by allowing the unused existing customer ports to be automatically freed up from pre-assigned fast optical switch ports in order to be reassigned to newly added customer ports based on customer demand), and to enable oversubscription of fast optical switch ports (e.g., enabling the fast optical switch to be connected to more customer ports than it can handle and automatically provisioning the ports to avoid port conflicts). Additionally, an optical switch fabric including the cascaded optical switch may provide a mechanism to create a universal customer port to be used in the optical switch fabric that can be dynamically assigned and used for multiple levels of service (e.g., SLA <30 min or SLA <24 hours), to create dynamic protection and/or restoration of fiber cross-connects via spare and/or redundant fast optical switches (e.g., from a first fast optical switch to a spare and/or redundant fast optical switch), to create dynamic protection and/or restoration of fiber cross-connects via the slow optical switch (e.g., from a first fast optical switch to the slow optical switch), and to enable deployment of the optical switch fabric including a cascaded optical switch and its benefits to multiple data centers.

In one example, this disclosure describes a cascaded optical switch for an optical switch fabric of a data center, the cascaded optical switch including: a fast optical switch having input ports and output ports; a slow optical switch having input ports and output ports, wherein a switching time of the slow switch is longer than a switching time of the fast optical switch; a first pre-cabled optical fiber connecting a first port that is one of the output ports of the slow optical switch to a second port that is one of the input ports of the fast optical switch; and a second pre-cabled optical fiber connecting a third port that is one of the output ports of the fast optical switch to a fourth port that is one of the input ports of the slow optical switch, wherein the fast optical switch or the slow optical switch is configured to receive configuration data to modify a switching configuration to configure a fiber cross-connect in the optical switch fabric that includes at least one of the first pre-cabled optical fiber or the second pre-cabled optical fiber.

In another example, this disclosure describes a method including: receiving, by a slow optical switch of a cascaded optical switch or by a fast optical switch of the cascaded optical switch, configuration data to modify a switching configuration to configure a fiber cross-connect in an optical switch fabric that includes at least one of a first pre-cabled optical fiber or a second pre-cabled optical fiber, wherein the fast optical switch comprises input ports and output ports, wherein the slow optical switch comprises input ports and output ports, wherein a switching time of the slow switch is longer than a switching time of the fast optical switch, wherein the first pre-cabled optical fiber connects a first port that is one of the output ports of the slow optical switch to a second port that is one of the input ports of the fast optical switch, wherein the second pre-cabled optical fiber connects a third port that is one of the output ports of the fast optical switch to a fourth port that is one of the input ports of the slow optical switch.

In another example, this disclosure describes a system including: a programmable network platform configured to determine configuration data to modify a switching configuration to configure a fiber cross-connect in an optical switch fabric; and a cascaded optical switch for an optical switch fabric of a data center, the cascaded optical switch including: a fast optical switch having input ports and output ports; a slow optical switch having input ports and output ports, wherein a switching time of the slow switch is longer than a switching time of the fast optical switch; a first pre-cabled optical fiber connecting a first port that is one of the output ports of the slow optical switch to a second port that is one of the input ports of the fast optical switch; and a second pre-cabled optical fiber connecting a third port that is one of the output ports of the fast optical switch to a fourth port that is one of the input ports of the slow optical switch, wherein the fast optical switch or the slow optical switch is configured to receive the configuration data from the programmable network platform to modify the switching configuration to configure the fiber cross-connect in the optical switch fabric that includes at least one of the first pre-cabled optical fiber or the second pre-cabled optical fiber.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
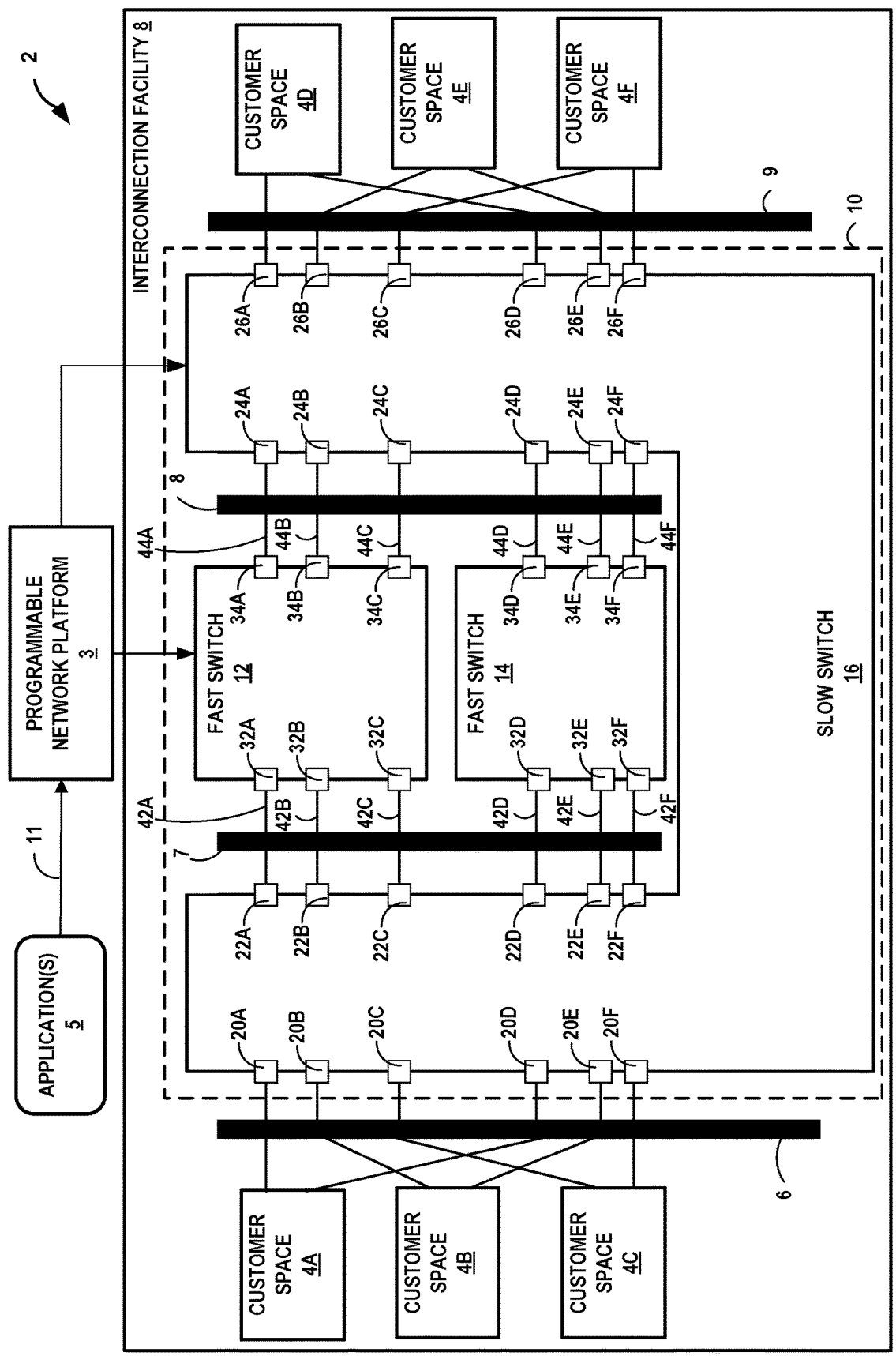
FIG. 1 is a block diagram that illustrates an example interconnection system including a cascaded optical switch, in accordance with one or more techniques of the disclosure.

Fiber cross-connects may be automatically provisioned between customers of an interconnection facility. In some examples, a programmable network platform for an interconnection facility exposes an interface by which customers of the interconnection system provider may request fiber cross-connects to other customers of the interconnection system provider, or by which the interconnection system provider may create such fiber cross-connects between customers. The programmable network platform may, in response to a request for a fiber cross-connect, configure an optical switch of the interconnection facility network infrastructure to create a fiber cross-connect between the demarcation points for the customers to be interconnected. The fiber cross-connect may facilitate non-blocking switching by way of a high-speed fiber connection between respective customers spaces for the customers and, in doing so, may provide reliable and low-latency communication between the respective demarcation points of the customer spaces. The fiber cross-connect may in this way underlie higher-layer network services exchanged between the customers. Such network services may include Ethernet or other layer 2 (L2) services, Internet or other layer 3 (L3) services for direct L3 peering between the customers, Optical Transport Services for Layer 0 and Layer 1 (L0/L1) services, and/or cloud-based services exchanges whereby the interconnection facility operates as a L3 autonomous system for indirect L3 route exchange between the customers via peering with the L3 autonomous system. In some examples, the programmable network platform may configure an optical switch of the interconnection facility network infrastructure to provision and/or provision one or more fiber cross-connects for dark fiber management.

In some examples, "customer" or "tenant" spaces located within the interconnection facility are each associated with a customer of the interconnection system provider. The interconnection system provider pre-installs fiber infrastructure for the optical switch of the interconnection facility, including one or more optical fibers, to each customer space such that the demarcation point between the provider and the customer for the customer space has a physical coupling with the pre-installed fiber infrastructure for sending and receiving optical signals by way of at least one optical fiber run to the customer space demarcation point. The programmable network platform, in response to receiving a service request to create a fiber cross-connect between customer spaces for respective customers, configures a fiber optical switch of the interconnection facility to create fiber cross connects and to switch optical signals through the optical switch between the demarcation points according to one or more optical paths determined by the programmable network platform for the requested fiber cross-connect.

As a result, the techniques may provide an automated fiber cross-connect service for the rapid and automatic establishment of physical fiber level connections between many different types of services (e.g., cloud exchange, Internet exchange, Internet transit, Optical Transport) using different network equipment (e.g., routers, switches, and optical dense wave-division multiplexing (DWDM) transport platforms) across the floor of an interconnection facility, between floors, across campuses, and across distributed interconnection facilities within a metro. Such automated fiber cross connects may be set up remotely and on-demand, with automated provisioning after manual pre-installation of the fiber infrastructure. The techniques may further allow for optical performance monitoring and loopback for trouble shooting, along with reduced capital expenditure (CapEx) investment due to better utilization of fiber tray space. Short-term, temporary, and/or recurring fiber cross-connects may also be facilitated as a result of the described techniques. One or more of the above advantages may facilitate increasing service growth for the interconnection service provider. In addition, because fiber cross-connects are automatically provisioned rather than using manually-run fiber cabling, the fiber cross-connects may be disconnected automatically as well, and the fiber segments that made up the fiber cross-connects may be reused for new customers and/or new fiber cross connects, which may alleviate the need to remove fiber cables from cable tray and, as a result, may improve overall SLA satisfaction due to fewer optical fiber cable breakages. Further, by provisioning fiber cross connects within centrally-managed interconnection facilities not publicly accessible, the techniques may provide better secured, more private, and lower latency connections than a fiber-based connection established over a service provider transport network, for instance.

FIG. 1 is a block diagram that illustrates a high-level view of an interconnection system 2 having a programmable network platform 3 that offers automated fiber cross-connects between customer space of an interconnection facility in accordance with techniques described herein. Interconnection system 2 depicts an interconnection facility 8 operated by an interconnection system provider, the interconnection facility 8 having an optical switch fabric including a cascaded optical switch 10 configurable for cross-connecting customer networks located within multiple customer spaces 4A-4F (collectively, "customer spaces 4"). In some instances, each of customer spaces 4 may be associated with a different customer of the interconnection system provider. In some instances, customer spaces 4 are both associated with a single customer of the interconnection system provider. As used herein, the term "customer" of the interconnection system provider may refer to a tenant of the interconnection facility 8 deployed by the interconnection system provider, whereby the customer leases space within the interconnection facility 8 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity.

In the interconnection facility 8, space may be partitioned and leased to customers in flexible increments in the form of spaces, e.g., cabinets, racks, suites (an enclosed room that is not part of a common floor space), or other customer space in which customers may situate their network equipment to provide and/or receive network services to/from other customer(s) co-located in the interconnection facility 8. In some examples, a customer space may be an area and/or "cage" of a common floor space enclosed by a fence or other demarcation. Although illustrated and primarily described with respect to customer spaces 4 in interconnection facility 8, the techniques of this disclosure are similarly applicable for automatically cross-connecting customer equipment distributed within an interconnection facility 8 (or distributed interconnection facilities) in various space factors, such as those identified above.

Each of spaces 4 are installed by the interconnection system 2 provider and provide a secure structure and location for a customer to store and access their customer network, while also having access to optical network infrastructure and cascaded optical switch 10, e.g., via a customer side of a fiber patch panel (not shown) situated within the space 4 that defines a boundary or "demarcation" within the interconnection facility, in that the customer alone has access to the space interior. Such fiber patch panels (more simply and hereinafter, "panels") may also provide the interconnection system 2 provider with convenient and secure access to a provider side of the panels. For example, the provider may be able to access the provider-sides of panels for spaces 4 without accessing the interior of spaces 4. Likewise, the customers leasing or otherwise having access to the interiors of spaces 4 may be able to access the customer sides of panels but may be prevented from accessing the provider sides of panels. In some examples, the provider may be able to access a secure hallway between spaces 4, which may allow access to the provider side of the panels.

In accordance with techniques described in this disclosure, cascaded optical switch 10 may represented or be included within an optical switch fabric that includes optical and photonic switching infrastructure that is configured by programmable network platform 3 to automatically create fiber cross-connects that connect customer spaces 4. As described in further detail below, cascaded optical switch 10 includes one or more fast optical switches (e.g., fast optical switch 12 and fast optical switch 14) and slow optical switch 16. Slow optical switch 16 has a switching time that is longer than switching times of fast optical switch 12 and fast optical switch 14, e.g., because slow optical switch 16 may switch sequentially and fibers and/or connectors may need to move over longer distances to establish a connection. In some examples, slow optical switch 16 may be lower cost, more reliable and/or robust than the fast optical switches 12, 14. For example, slow optical switch 16 may not require ongoing power or active maintenance to maintain a connection (e.g., latching). Slow optical switch 16 may have a low optical insertion loss, e.g., lower insertion losses than fast optical switches 12, 14, and slow optical switch 16 may have field-replaceable electro-mechanical components. In some examples, fast optical switches 12, 14 may have a higher per port cost, may be non-latching (e.g., lose connection upon loss of electrical power), and lower switch and/or port density than slow switch 16, but fast switches 12, 14 may have faster switching times than slow optical switch 16. In some examples, fast optical switches 12 and/or 14 may be configured to perform a plurality of switching actions, e.g., input/output port connections and/or reconnections, simultaneously and/or substantially concurrently, e.g., as opposed to sequentially or "one at a time."

The cascaded optical switch 10 may include pre-cabled (e.g., pre-installed or pre-provisioned) optical fibers 42A-42F (collectively, "pre-cabling 42") connecting output ports 22A-22F (collectively, "slow switch output ports 22") of slow optical switch 16 to input ports 32A-32F (collectively, "fast switch input ports 32") of fast optical switches 12 and/or 14. The cascaded optical switch 10 may also include pre-cabled optical fibers 44A-44F (collectively, "pre-cabling 44") connecting output ports 34A-34F (collectively, "fast switch output ports 34") of fast optical switches 12 and/or 14 to input ports 24A-24F (collectively, "slow switch input ports 24") of slow optical switch 16.

Network traffic, data, signals, or the like that exits slow optical switch via ports 22 enters fast optical switch 12 or 14 via ports 32, and network traffic, data, signals, or the like that exists fast optical switch 12 or 14 via ports 34 enters slow optical switch via ports 24.

For ease of illustration and description purposes, FIG. 1 depicts input ports 20, 32, and 24 and output ports 22, 34, and 26 for directional optical communications from "left-to-right" in FIG. 1. In some examples, each of input ports 20, 32, and 24 would have a corresponding output port, and each of output ports 22, 34, and 26 would have a corresponding input port, to facilitate bi-directional optical cross-connects between pairs of customer spaces 4. In such examples, the "right-to-left" direction of optical communications would be pre-provisioned, and fast switches 12, 14, and slow switch 16 configured in a similar manner to that described with respect to what is illustrated in FIG. 1. Thus, while customer spaces 4A-4C are primarily described as transmitting optical signals to customer spaces 4D-4F, additional ports and pre-cabling of slow switch 16 and fast switches 12, 14 in some examples facilities customer spaces 4D-4F transmitting optical signals to customer spaces 4A-4C.

In the example shown, cascaded optical switch 10 may include (optionally redundant) pre-cabled optical fibers connecting input ports 20 of slow optical switch 16 to customer spaces 4A-4C and may also include (optionally redundant) pre-cabled optical fibers connecting output ports 26 of slow optical switch 16 to customer spaces 4D-4F. In some examples, multiple portions of optical fiber cross-connects between customer spaces 4 via cascaded optical switch 10 may include shared/trunked fiber cabling, and interconnection facility 8 may include one or more fiber patch panels, e.g., fiber patch panels 6 and 9 in the example shown, to take advantage of the shared/trunked fiber cabling (each of fiber patch panels 6 and 9 may represent multiple fiber patch panels). Cascaded optical switch 10 may include one or more fiber patch panels, e.g., fiber patch panels 7 and 8 in the example shown, to facilitate easier reconfiguration of the optical connections among output ports 22 and input ports 32 and among output ports 34 and input ports 24.

Fast switches 12, 14 and slow switch 16 may be located within an interconnection provider space within interconnection facility 8. Customers may be prevented from accessing the interconnection provider space to modify the cabling or configurations of fast switches 12, 14 and slow switch 16.

Cascaded optical switch 10 may provide one or more technical advantages that realize at least one practical application. For example, once a fiber cross-connect is made (e.g., provisioned), the portions of the fiber cross-connect including slow switch 16 do not need electrical power to maintain the connection (latching). Slow switch 16 may also be serviced without interrupting existing connections, and even during electrical power or other failure scenarios, slow switch 16 will maintain its connections in order to carry network/signal/data traffic, unlike a fast switch alone. In some examples, cascaded optical switch 10 doesn't significantly impact the total end-to-end fiber cross-connect link budget (e.g., signal losses due to physical connections or interconnections at ports, patch panels, or the like) across cascaded optical switch 10, as opposed to other switching schemes, because slow optical switch 16 has much lower insertion loss as compared to fast switches.

Additionally, cascaded optical switch 10 may provide maintenance of a level of service, e.g., SLA <30 min, while installing/deinstalling customer fiber cross-connects. For example, slow switch 16 may be configured to provision connections between pre-cabled infrastructure, e.g., pre-cabled ports 22 and 32 at patch panel 7, ports 34 and 24 at patch panel 8, and pre-cabled customer space 4 ports at patch panel 6 to ports 20 and patch panel 9 to ports 26. In other words, slow switch 16 of cascaded optical switch 10 may be configured to "re-fiber" the pre-cabling infrastructure so that pre-assigned ports of fast switches 12, 14 may be re-assigned to existing or additional customer spaces 4. For example, interconnection system 2, utilizing cascaded optical switch 10, may be configured to dynamically re-assign unused ports of fast optical switches 12, 14 via slow optical switch 16 to improve utilization of the ports of fast switches 12, 14. If there is new demand for SLA <30 min from existing or new customer spaces 4, unused ports may be re-groomed and/or re-assigned via slow optical switch 16 for a new pre-cabling assignment to pre-existing or new customer spaces 4, e.g., without impact to existing network/signal/data traffic on other customers' ports. In this way, among others, cascaded optical switch 10 may provide improved port utilization and reduced CapEx spending to deploy additional fast optical switches. In some examples, slow switch 16 may be configured to "re-fiber" the pre-cabling infrastructure sequentially, and may exceed the 30 minute SLA if multiple reconfiguring actions are requested to take place at substantially the same time or during the same time period. However, slow switch 16, operating sequentially, may still be configured to "re-fiber" the pre-cabling infrastructure and still meet a SLA <30 minutes by prioritizing the plurality of reconfiguration actions requested.

Slow optical switch 16 and fast optical switches 12 and/or 14 may be configured to receive configuration data to modify a switching configuration to reconfigure a fiber cross-connect in the optical switch fabric that includes at least one of the pre-cabled optical fibers connecting output ports 22 to input ports 32 or at least one of the pre-cabled optical fibers connecting output ports 34 to input ports 24.

System 2 further includes a programmable network platform (PNP) 3, alternatively referred to herein as an "interconnection platform." Programmable network platform 3 may expose a software interface that defines the methods, fields, and/or other software primitives by which application(s) 5 may invoke PNP 3 to dynamically provision a fiber cross-connect between customer spaces 4. In this way, PNP 3 allows customers, carriers, network service providers (NSPs), and/or the interconnection system provider itself with the programmatic capability of configuring the optical switch fabric and cascaded optical switch 10 to interconnect customer spaces 4.

Programmable network platform 3 may represent an application executing within one or more data centers of system 2 or alternatively, off-site/remotely at a back office or branch of the interconnection system 2 provider, for instance. Programmable network platform 3 may control service provisioning for multiple different interconnection facilities. Alternatively or additionally, multiple separate instances of the programmable network platform 3 may control service provisioning for respective multiple different interconnection facilities.

Application(s) 5 represents at least one application that communicates with PNP 3 to request and dynamically provision fiber cross-connects within the optical switch fabric including cascaded optical switch 10 and establish fiber-based connectivity between customer spaces 4. Application(s) 5 represent client-side software for interfacing with PNP 3 and may include a customer portal, customer applications, an interconnection system 2 provider application that is accessible only to interconnection facility 8 operators, a console such as a command-line interface or graphical user interface. Users or clients of application(s) 5 may include enterprise customers, cloud service and content providers, carriers, network service providers (NSPs), and/or the interconnection system provider itself, for instance.

An application of application(s) 5 issues, to PNP 3, a fiber cross-connect request 11 that specifies parameters for a fiber cross-connect between customer spaces 4. Fiber cross-connect request 11 may specify, for instance, an optical signal profile including a bandwidth or data rate and protocol, a start time at which the requested fiber cross-connect should be operational, an end time at which the requested fiber cross-connect should be torn down (potentially indefinite until the contract term expires), and port identifiers for panel ports at demarcation panels of customer spaces 4.

In response to fiber cross-connect request 11, PNP 3 determines an optical path through the optical switch fabric and cascaded optical switch 10 and dynamically provisions fiber cross-connects in the optical switch fabric and cascaded optical switch 10 to provide fiber-based interconnection between customer spaces 4 to satisfy the fiber cross-connect request 11. PNP 3 may determine the optical path through cascaded optical switch 10 by identifying pre-installed but unused fibers that connect to unused ports on photonic switch connections that together make up an end-to-end optical path between customer spaces 4. In some examples, a mesh of cascaded optical switches 10 make up the optical switch fabric of the interconnection facility or facilities. The optical switch fabric may include additional optical devices, including other optical fast switches or optical slow switches.

PNP 3 configures elements of the optical switch fabric and cascaded optical switch 10 by issuing configuration commands either directly to such elements by way of configuration interfaces of the elements, or indirectly to such elements via software-defined networking (SDN) controllers that manage the elements on behalf of the PNP 3. PNP 3 may in some instances be alternatively referred to as an orchestrator in that PNP 3 orchestrates SDN controllers so as to configure photonic switches and/or other elements of optical switch fabric 10 to establish fiber cross-connects between pairs of customer spaces 4.

Fiber cross-connects involving cascaded optical switch 10 may represent a Layer 0 ("L0") connection in that the fiber cross-connect underlies the Open Systems Interconnection (OSI) model or TCP/IP model for packet networking. In particular, the fiber cross-connects may underlie an optical transport network (OTN) layer that (typically in conjunction with a SONET/SDH layer) provides Layer 1 ("L1") connectivity between optical networking devices such as wavelength division multiplexing (WDM) devices. For instance, the fiber cross-connects may represent one or more wavelengths (or "lambdas") photonically switched by elements of optical switch fabric to provide an optical path (or "light path") for optical signals exchanged between customer spaces 4 associated with different customers/tenants of the interconnection system 2 provider. In this way, the optical switch fabric including cascaded optical switch 10 is configured to provide non-blocking switching by way of a high-speed fiber connection between respective customers spaces 4 for the customers of the interconnection system 2 provider and, in doing so, may provide reliable and low-latency communication between the respective demarcation points of the customer spaces 4.

Customer networks (not shown) use respective access links (not shown) to access the fiber cross-connects of cascaded optical switch 10 to exchange data. The access links may represent, in some instances, grey links/optics, in which a router or switch of the customer networks exchanges grey (uncolored) optical signals with a transponder that converts between a grey optical signal and an optical signal at a specific wavelength (color) exchanged with a WDM device of optical switch fabric and cascaded optical switch 10. The fiber cross-connects may in some cases underlie a layer 2 ("L2") or layer 3 ("L3") service provided by the interconnection system 2 provider to interconnect customer spaces 4 according to an L2 or L3 service. For example, interconnection facility 8 may operate a network services exchange, such as Ethernet Exchange, and Internet Exchange, and/or a Cloud Exchange, and each of these may make use of dynamically-provisioned fiber cross-connect 7 to transmit L2/L3 packet data between the customer networks.

Further example details of a facility that provides a cloud-based services exchange are found in U.S. Provisional Patent Application 62/149,374, filed Apr. 17, 2015 and entitled "Cloud-Based Services Exchange;" U.S. Provisional Patent Application 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. Provisional Patent Application 62/160,547, filed May 12, 2015 and entitled "PROGRAMMABLE NETWORK PLATFORM FOR A CLOUD-BASED SERVICES EXCHANGE;" each of which are incorporated herein by reference in their respective entireties.

As a result of dynamically provisioning a fiber cross-connect between customer spaces 4 via cascaded optical switch 10, the techniques may allow the interconnection provider to offer customers a variety of SLAs to meet a variety of purposes/use cases. Slow optical switch 16 has a high port count and can offer connectivity to many more other networks than fast optical switches 12 and/or 14, but the slow optical switch 16 alone may be unable to address use cases that require shorter switching times, such as for failover/redundancy or quicker interconnections. In addition, the interconnection provider can offer multiple SLAs, and can offer the ability to change between service levels, e.g., to change the SLA. For example, the interconnection provider may offer a first level of service that meets a first SLA may guarantee a customer's interconnection order will be completed in 24 hours or less (e.g., SLA <24 hour) for which the provider may reconfigure the slow switch 16. The interconnection provider may offer a second level of service that meets a second SLA may guarantee a customer's interconnection order will be completed in 30 minutes or less (e.g., SLA <30 min.) for which the interconnection provider may use one or more fast switches, e.g., fast switches 12 and/or 14. The interconnection provider may further offer tiers of SLAs and allow customers to change their level of service. In response to a change of service request, the interconnection provider may utilize multiple switch technologies, e.g., via integrating one or more of fast optical switches 12 and/or 14 within slow optical switch 16. As a result, cascaded optical switch 10 will enable the optical switch fabric to be highly optimized, flexible, and adaptable to customer demands.

Figure 2:
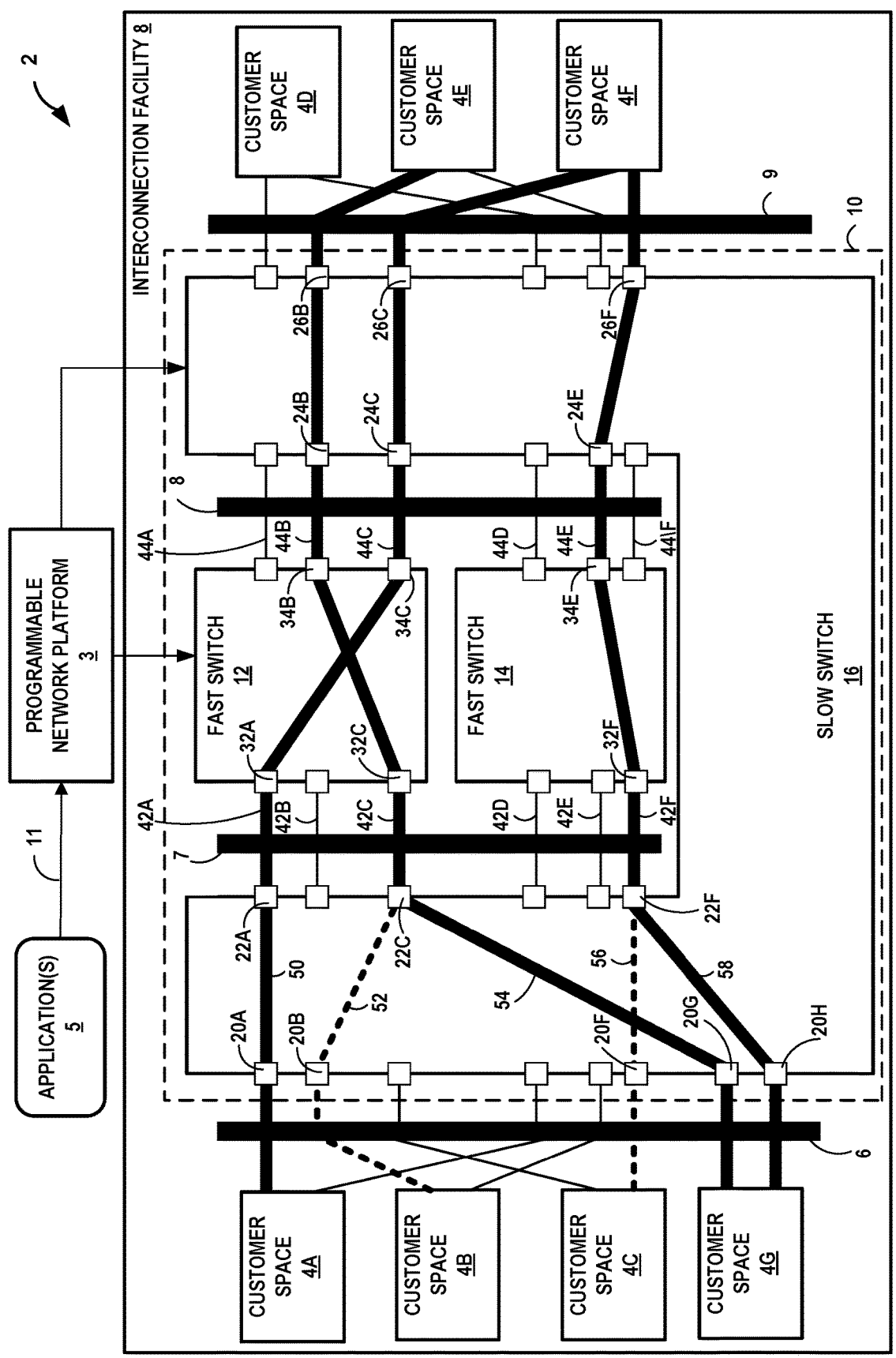
FIG. 2 is a block diagram that illustrates a high-level view of an example optical interconnection scheme via the example interconnection system of FIG. 1, in accordance with techniques described herein.

FIG. 2 is a block diagram that illustrates a high-level view of an example optical interconnection scheme via the example interconnection system 2 of FIG. 1 in accordance with techniques described herein. In the example shown, interconnection system 2 is provisioned to offer fiber cross-connects 50, 52, 54, 56, and 58. Fast optical switches 12, 14 or slow optical switch 16 may be configured to modify a switching configuration of cascaded optical switch 10 to reconfigure fiber cross-connects between spaces 4 in the optical switch fabric, e.g., fiber cross-connects 50-58, that each includes at least one of pre-cabled optical fibers 42 or 44.

For example, a customer may request a fiber cross-connect having a SLA <30 min between customer spaces 4A and 4F. PNP 3 may determine configuration data to modify a switching configuration of cascaded optical switch 10, and fast optical switches 12, 14 or slow optical switch 16 may receive the configuration data and modify the switching configuration to reconfigure a fiber cross-connect 50 via pre-cabled fibers 42A and 44C.

In some examples, multiple ports of fast switches 12 and 14 may be pre-cabled to ports of slow switch 16. When there is new demand from a customer, e.g., for a fiber cross-connect having a SLA <30 min, PNP 3 may provision switch connections across fast switches 12 or 14 to meet the new demand to take advantage of existing, pre-cabling 42, 44, as opposed to requiring new cabling to an open port of fast switches 12, 14. Additionally, cascaded optical switch 10 may be used to avoid port stranding of fast optical switches 12, 14.

As another example, a new customer demand may be for fiber cross connects 54, 58 having a SLA <30 minutes between an additional customer space 4G and customer spaces 4E and 4F. PNP 3 may determine that previous customer demand for fiber cross connects 52, 56 is no longer required, and may send configuration data for slow optical switch 16 to reprovision fiber cross connects 52, 56 to fiber cross-connects 54, 58. For example, rather than input ports 32C and 32F being stranded by previous customer demand or having to re-cable ports 32C and 32F, slow optical switch 16 is configured to switch the port connections to ports 32C and 32F without re-cabling. In the example shown, slow optical switch 16 is configured to receive the configuration data from PNP 3 and modify its switching configuration to reprovision ports 32C and 32F to connect to ports 20G and 20H, respectively, to reconfigure fiber cross-connects 52, 56 as fiber cross-connects 54, 58, respectively.

In some examples, cascaded optical switch 10 is configured to allow for oversubscription of fast optical switches 12, 14. For example, cascaded optical switch 10 may include a total number of ports pre-cabled to ports of customer spaces 4 that is greater than the total number of ports of fast switches 12, 14, alone or together, and slow optical switch 16 is configured to dynamically re-assign unused fast switch 12, 14 ports, e.g., as described above with respect to new (and/or changing) customer demands. In the example shown, slow switch 16 includes ports 20A-20H and 26A-26F pre-cabled to customer spaces 4 (e.g., 14 ports) and fast switches 12, 14 together include ports 32A-32F and 24A-34F pre-cabled to other ports of slow optical switch 16 (e.g., 12 ports). In the example shown, slow optical switch 16 is configured to dynamically switch between connecting ports pre-cabled to customer spaces and ports pre-cabled to fast switches 12, 14, e.g., to switch between connecting port 22C (which is pre-cabled to fast optical switch 12 port 32C) to ports 20B and 20G (both of which are pre-cabled to a customer space, e.g., spaces 4B and 4G, respectively).

Figure 3:
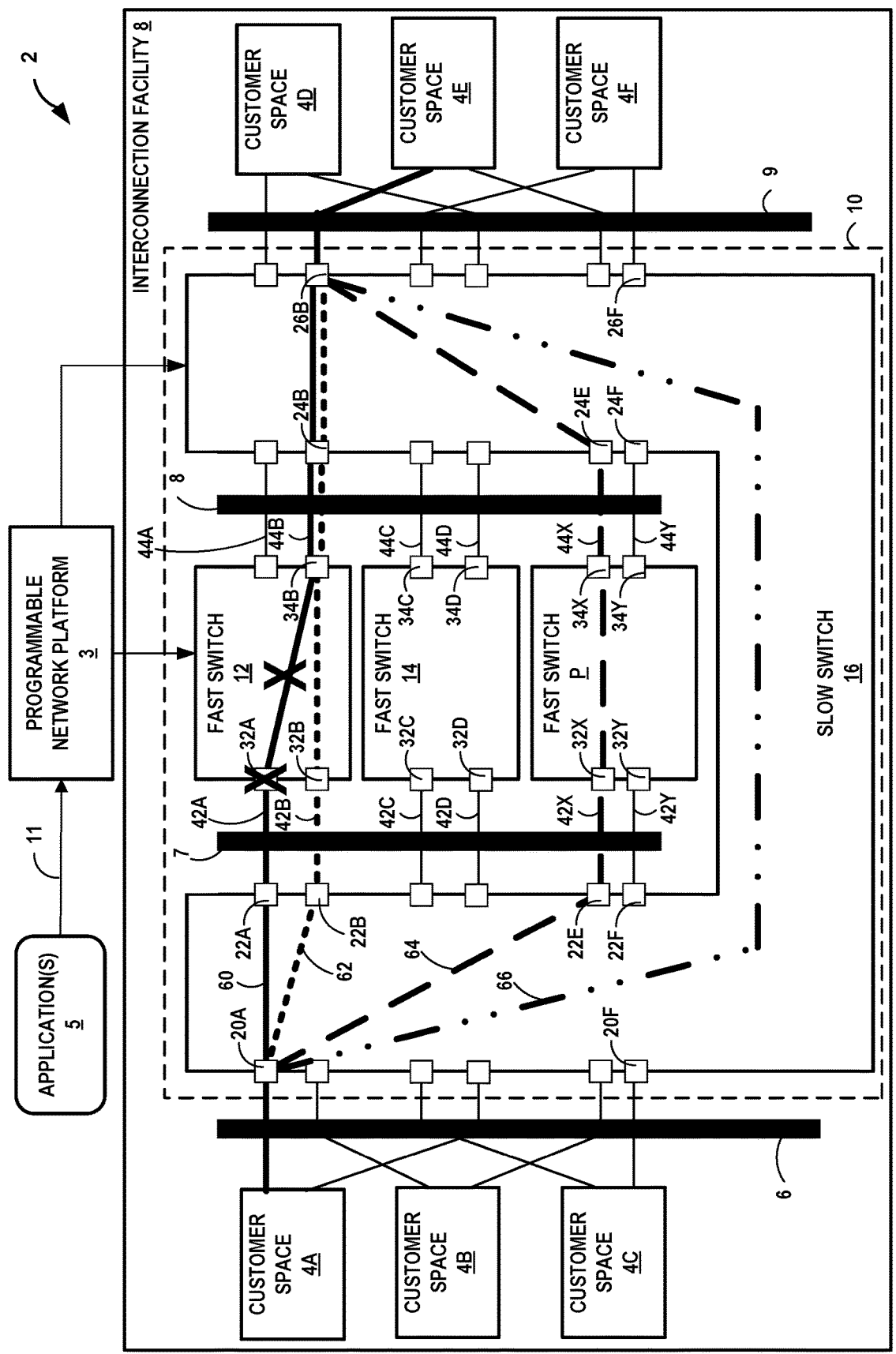
FIG. 3 is a block diagram that illustrates a high-level view of another example optical interconnection scheme via the example interconnection system of FIG. 1 in accordance with techniques described herein.

FIG. 3 is a block diagram that illustrates a high-level view of another example optical interconnection scheme via the example interconnection system 2 of FIG. 1 in accordance with techniques described herein. In the example shown, interconnection system 2 includes fiber cross-connects 60, 62, 64, and 66 and a fast optical switch P.

Fast optical switch P may be used as a spare fast optical switch, e.g., a "protection" fast optical switch in case of failure of fast optical switch 12 or 14. Cascaded optical switch 10 in this example implementation includes one or more protection fast optical switches P, which may reduce switch fabric downtime and improve system availability, e.g., in the event of a failure. In some examples, all of the ports of protection fast optical switches P may be pre-cabled to ports of slow switch 16, e.g., input ports 32X, 32Y and output ports 34X, 34Y may be pre-cabled to ports of slow switch 16, e.g., via pre-cabled optical fibers 42X, 42Y and 44X, 44Y.

In some examples, in the event of a fast switch port failure, or failure of an entire fast switch, fast optical switches 12, 14, P or slow optical switch 16 may be configured to modify a switching configuration of cascaded optical switch 10 to reconfigure fiber cross-connects between spaces 4 in the optical switch fabric, e.g., fiber cross-connects 60-66, that include at least one of pre-cabled optical fibers 42 or 44. Fast optical switches 12, 14, P or slow optical switch 16 may be configured to modify a switching configuration to switch from a faulty port of a fast optical switch to another port in the same fast switch, to another port on a different fast optical switch, to switch all ports of a faulty fast optical switch to a different fast optical switch (e.g., protection fast optical switch P), or to bypass the fast optical switches and provision the fiber cross connect within slow switch 16 (e.g., in the event of a catastrophic failure for which SLA <30 may no longer be provided for one or more fiber cross-connects).

For example, cascaded optical switch 10 may be configured to provision fiber cross-connect 60 between customer space 4A and customer space 4D. Port 32A may experience a failure, and slow switch 16 may be configured to then reprovision the fiber cross-connect, e.g., to provision fiber cross-connect 62 between customer space 4A and 4D via another available port of the same fast optical switch, e.g., port 32B of fast optical switch 12 by switching input port 20A to output port 22B in slow optical switch 16 instead of to output port 22A.

Additionally or alternatively, slow switch 16 may be configured to reprovision the fiber cross-connect between customer space 4A and 4D via another available port of a different fast optical switch, e.g., port 32X of fast optical switch P to provision fiber cross-connect 64. For example, if only a few ports of fast optical switch 12 are down, e.g., port 32A, PNP 3 may automatically reassign the individual failed ports to good, e.g., functioning, ports in fast optical switch P and automatically copy the failed port connection data (e.g., stored within a connection database of system 2) of the failed ports of fast optical switch 12 (e.g., port 32A) to fast optical switch P (e.g., in order to be able to restore and/or reassociate the connection data with the fast optical switch of the failed ports once those ports are restored). In some examples, each fast optical switch of cascaded optical switch 10 may have a dedicated fast optical switch P, and in other examples, two or more of the fast optical switches of cascaded optical switch 10 may share one or more fast optical switches P, e.g., on a port-by-port basis.

In some examples, fast optical switch P may be a spare or redundant switch for fast optical switches 12 and/or 14. For example, if fast optical switch 12 fails, PNP 3 may automatically reassign the entire pre-cabling connections to customer spaces 4 from fast optical switch 12 to fast optical switch P via slow optical switch 16 and automatically copy the connection data of all of the ports of fast optical switch 12 to fast optical switch P, i.e., configure fast optical switch P to replicate the optical connectivity between output ports 22 and input ports 24 of slow optical switch 16 previously offered by fast optical switch 12.

In some examples, each fast optical switch of cascaded optical switch 10 may have a dedicated, redundant instance of fast optical switch P. In other examples, two or more of the fast optical switches of cascaded optical switch 10 may share one or more fast optical switches P, e.g., on a port-by-port basis and/or on a switch-by-switch basis.

Additionally or alternatively, slow switch 16 may be configured to reprovision the fiber cross-connect between customer space 4A and 4D without using a fast optical switch, e.g., provisioning slow optical switch 16 to connect port 20A and port 26B via fiber cross-connect 66, for example, in the event of a failure of all fast switches and/or ports as a failsafe to still maintain fiber cross-connects, albeit at a different SLA level, e.g., SLA <24 hours.

In the example shown, cascaded optical switch 10 along with software automation, e.g., via PNP 3, may provide improved network/signal/data traffic reliability, e.g., via improving the speed of restoration of network/signal/data traffic of a failed port, e.g., to be within minutes rather than hours, for examples, less than about five minutes. Additionally, cascaded optical switch 10 may provide improved restoration time of network/signal/data traffic from a failed entire fast optical switch, e.g., to be within hours rather than days.

In some examples, cascaded optical switch 10 may be configured to dynamically reassign ports for different SLA levels, e.g., between SLA <30 min and SLA <24 hour, e.g., to effectively enable one or more ports to be "universal" ports. For example, a port at a customer space 4 may be a generic and/or universal port instead of a port with a dedicated service level, e.g., via pre-cabling to ports 20. In some examples, system 2 is configured to allow customers to dynamically assign and change port assignments of customer spaces 4 via cascaded optical switch, e.g., via interaction with applications 5.

For example, a customer of customer space 4A may request a SLA <30 min for a port of customer space 4A, e.g., pre-cabled to port 20A of slow optical switch 16, and cascaded optical switch 10 may then configure slow optical switch 16 and fast optical switch 12 to provision fiber cross-connect 60, e.g., via provisioning port connections between ports 20A, 22A and 24B, 26B in slow optical switch 16 and ports 32A, 34B in fast optical switch 12. In some examples, slow optical switch 16 may be pre-provisioned, e.g., between ports 20A, 22A and 24B, 26B during or before the customer request for SLA <30 min, and cascaded optical switch 10 may only need to provision fast optical switch 12 to provision fiber cross-connect 60 at the time of the customer request for SLA <30 min. The customer may then request a service level change for port 20A (equivalently the port of customer space 4A pre-cabled to port 20A), e.g., to SLA <24 hour, and cascaded optical switch 10 may dynamically reconfigure slow optical switch 16 to provision fiber cross connect 66, e.g., by provisioning the port connections between ports 20A and 26B of slow optical switch 16. The customer may then request another service level change of port 20A back to SLA <30 min, and cascaded optical switch 10 may then reconfigure slow optical switch 16 and fast optical switch 12 to provision fiber cross-connect 60. In some examples, PNP 3 and/or cascaded optical switch 10 may be configured to prioritize requests. For example, slow optical switch 16 may have a queue for requests and/or updating fiber cross-connects. A SLA <30 min fiber cross-connect request may have a high priority, and PNP 3 and/or cascaded optical switch 10 may send configuration data to slow optical switch 16 including the priority level and/or a command prioritizing the request within the queue for slow optical switch 16. For example, PNP 3 may be configured to determine that input ports 20A-20F are pre-provisioned and pre-connected to output ports 22A-22F, and that input ports 24A-24F are pre-provisioned and pre-connected to output ports 26A-26F. PNP 3 may then determine priority assignments such that a port may be used for and satisfy different SLA levels when switching between SLA levels, e.g., from SLA <30 min, to SLA <24 hours, and back to SLA <30 min.

Figure 4:
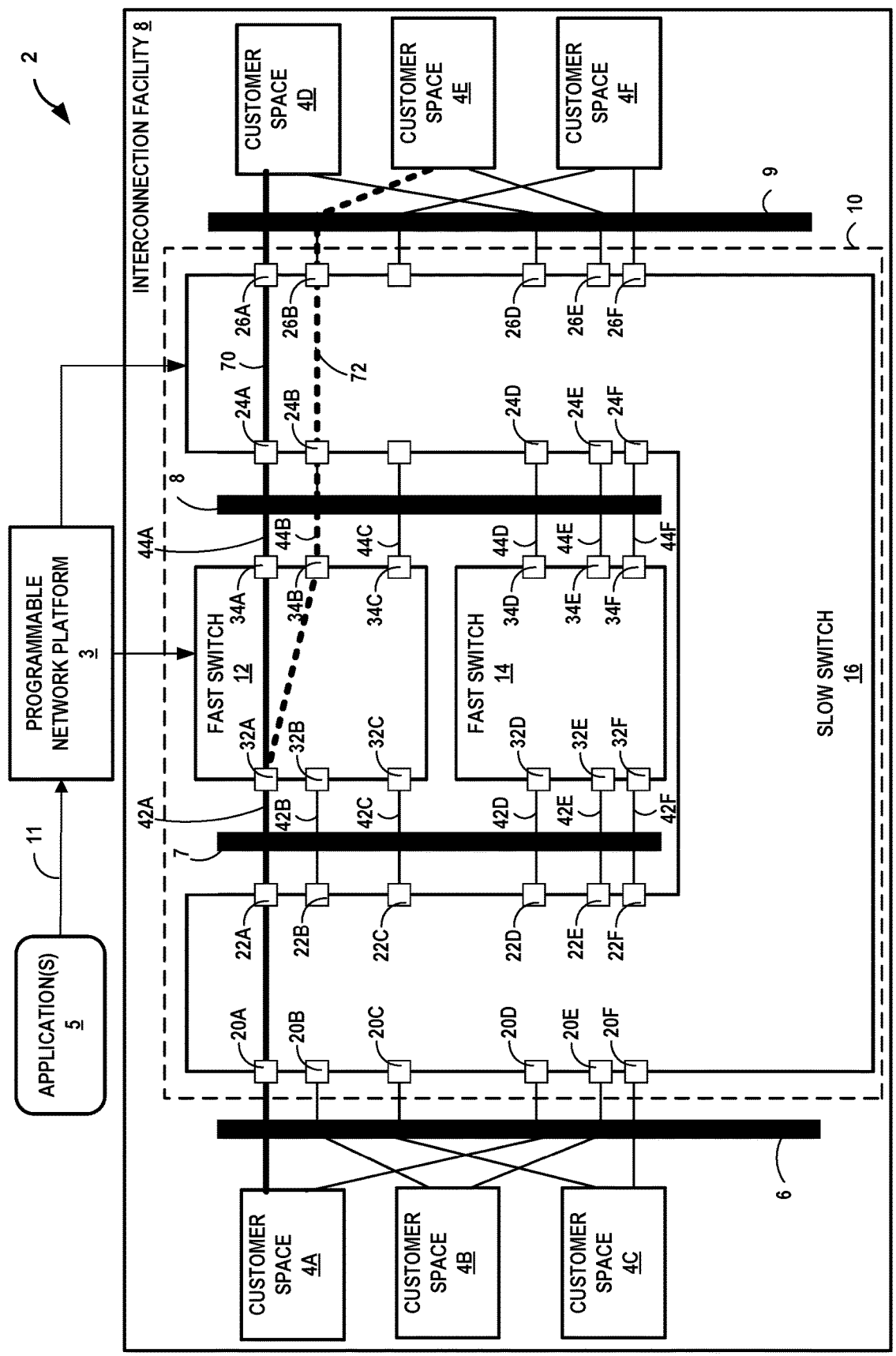
FIG. 4 is a block diagram that illustrates a high-level view of another example optical interconnection scheme via the example interconnection system of FIG. 1 in accordance with techniques described herein.

FIG. 4 is a block diagram that illustrates a high-level view of another example optical interconnection scheme via the example interconnection system 2 of FIG. 1 in accordance with techniques described herein. In the example shown, interconnection system 2 includes fiber cross-connects 70 and 72.

In the example shown, cascaded optical switch 10 is dynamically reconfigured from switching input port 20A to output port 26A as fiber cross-connect 70 between customer space 4A and customer space 4D to instead switch input port 20A to output port 26B as fiber cross-connect 72 between customer space 4A and customer space 4E, e.g., for a short duration, and then back to fiber cross-connect 70. To accomplish this, PNP 3 reconfigures fast switch 12 of cascaded optical switch 10 to switch input port 32A from output port 34A to output 34B, thereby achieving fast switching reconfiguration of a fiber cross-connect for customer space 4A from one destination customer space 4D to another destination customer age 4E without requiring re-cabling and achieving faster reconfiguration than could be achieved with slow optical switch 16 alone.

Figure 5:
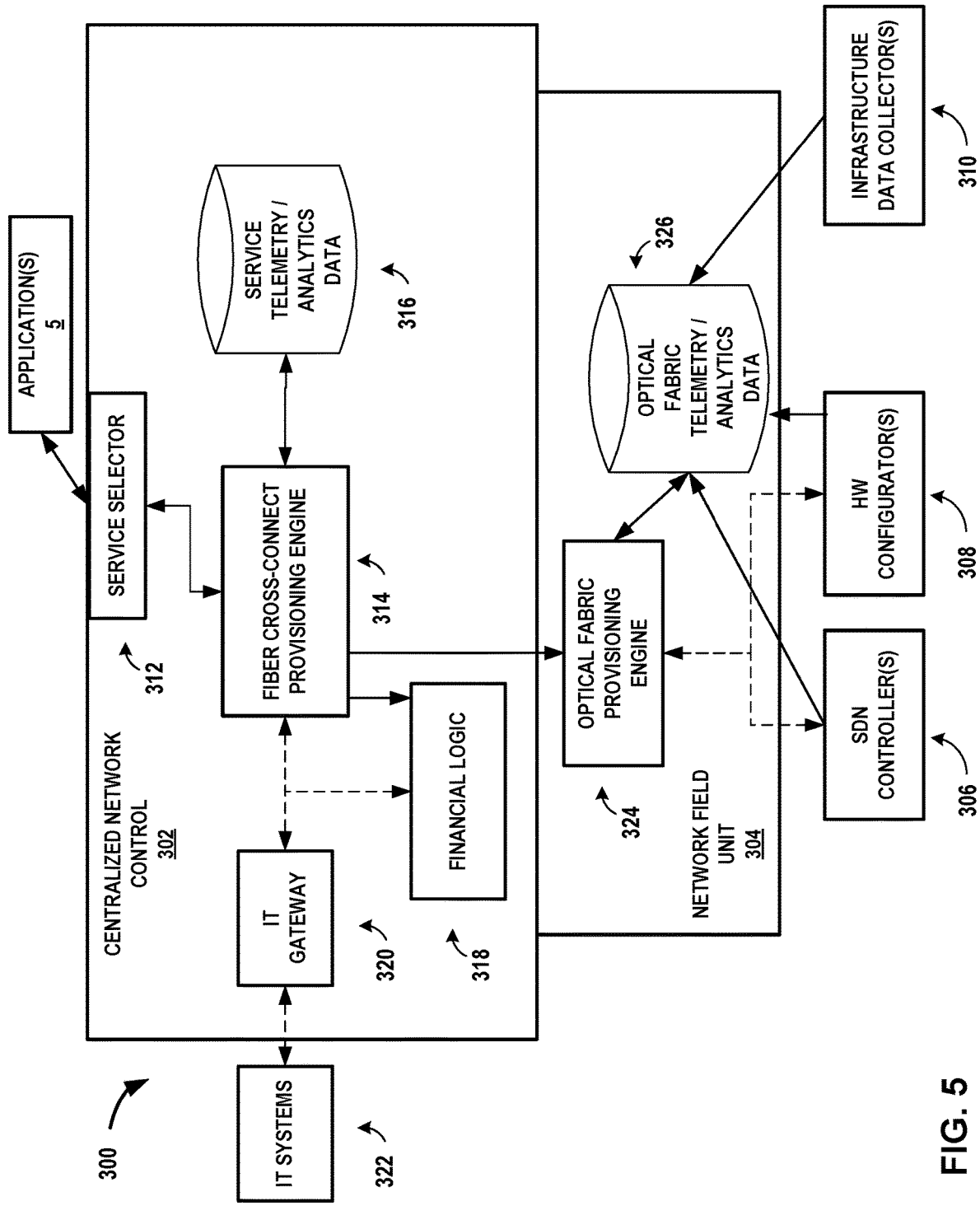
FIG. 5 is a block diagram illustrating an example architecture for a programmable network platform configured to dynamically provision fiber cross-connects within one or more interconnection facilities to interconnect multiple customers of the interconnection system provider.

FIG. 5 is a block diagram illustrating an example architecture for a programmable network platform 300 configured to dynamically provision fiber cross-connects within one or more interconnection facilities to interconnect multiple customers of the interconnection system provider. FIG. 5 illustrates a programmable network platform 300 that includes multiple components, which collectively provide for dynamic configuration and management of metro-based interconnection facilities, in particular for the dynamic provisioning of fiber cross-connects. Programmable network platform 300 includes centralized network control (CNC) system 302 and one or more network field units (NFUs) 304 configured to interface with one or more software-defined networking (SDN) controllers 306, one or more hardware configurator(s) 308, one or more infrastructure data collector(s) 310, and information technology systems 322. Programmable network platform 300 may represent an example instance of programmable network platform 3 or another programmable network platform, controller, or system described herein for automatically provisioning fiber cross connects using a cascaded optical switch.

Programmable network platform 300 may provide for the orchestration of a fiber cross-connect service. In the example of FIG. 5, CNC system 302 enables the automation of aspects of fiber cross-connect provisioning. As such, CNC system 302 may provide one or more software interfaces that allow customers to establish, de-install, and manage interconnections with other customers, such as one or more cloud service providers co-located in an interconnection facility, in an automated and seamless manner. CNC system 302 may include logic to receive a business service request via an API call and convert that into the necessary business instantiation parameters and network provisioning parameters to be delivered and assured as a business service. CNC system 302 may be the central intelligent processing unit of the orchestration system (e.g., programmable network platform 300) and there may be one logical instance of this intelligent logic present per instantiation.

In some examples, NFU 304 is implemented as a self-contained unit that receives requests or instructions from CNC system 302 to configure network infrastructure of a particular interconnection facility for one or more services. For instance, NFU 304 may comprise a combination of hardware and software. In some examples, NFU 304 may be a virtual machine. In any case, NFU 304 receives requests or instructions CNC system 302 based on customer requests submitted to CNC system 302. As further described below, NFU 304 may determine whether sufficient resources exist to provide the services requested by CNC system 302. If sufficient resources exist, NFU 304 may communicate or otherwise interoperate with SDN controllers 306, hardware configurators 308, and infrastructure data collectors 310 to configure the network infrastructure to provide the requested service. NFU 304 may represent a globally distributed intelligent logical unit that receives network instantiation commands from CNC system 302 and instantiates and configures the network resource that is needed to deliver the service. NFU 304 may have the intelligence to deliver and assure network services as per the request of CNC system 302 and also has the capability of communicating with a third party orchestration system if needed by the service request.

In some examples, multiple interconnection facilities may be geographically dispersed. Each geographically positioned interconnection facility may have a corresponding NFU that is geographically positioned at the same location as the respective cloud exchange point. The corresponding NFU may configure and otherwise manage the network infrastructure and optical switch fabric of the particular geographically positioned interconnection facility. In this way, a particular NFU may receive requests or instructions from CNC system 302 and configure the network infrastructure and optical switch fabric of the interconnection facility that is managed by the particular NFU. In some cases, multiple interconnection facilities of a metropolitan area make up a metro-based interconnection facility managed by a single NFU.

NFU 304 may therefore represent the distributed processing unit of programmable network platform 300, which provides programmable network platform 300 with the ability to horizontal scale and deliver and assure services. NFU 304 is the component of programmable network platform 300 that may provide the functionality of delivering the services in a vendor agnostic and form factor agnostic manner. As shown in FIG. 5, NFU 304 has several software components that enable the distributed processing unit to deliver the services.

In order to provision fiber cross-connects to customers and providers co-located in interconnection facilities managed by PNP 300, CNC system 302 includes a service selector 312. In some examples, service selector 312 may operate as an API gateway. For example, service selector 312 may expose software interfaces defined according to one or more APIs. Requests and/or instructions received by service selector 312 may include the form of create, read, update, and/or delete (CRUD) requests made with respect to fiber cross-connects provided by and/or delivered by the interconnection facilities. Applications may invoke endpoints of the APIs provided by service selector 312, which may in turn invoke fiber cross-connect provisioning engine 314. Service selector 312 may execute on one or virtual machines and/or real servers, for instance. Although shown as a single element in FIG. 5, service selector 312 may comprise a cluster of one or more physical and/or virtual computing machines executing on one or more physical processors. In some aspects, service selector 312 provides a service catalog the describes available services and providers for the available services.

Fiber cross-connect engine 314 may receive requests to provision services from service selector 312. Fiber cross-connect engine 314, in conjunction with network field unit 304, organizes, directs and integrates underlying hardware and software sub-systems for managing various aspects of service provisioning within the network infrastructure as well as cloud services management. For instance, fiber cross-connect provisioning engine 314 may provide a rule-driven workflow engine that operates between service selector 312 and the underlying optical switch fabric for at least one interconnection facility that is configured by network field unit 304. In this way, fiber cross-connect provisioning engine 314 can be invoked via service selector 312 by customer-proprietary applications or an interconnection system provider-based customer portal, for direct participation with the programmable network platform 300 of an automated fiber cross-connect infrastructure that is configured by network field unit 304. As further described below, NFU 304 may receive instructions and/or requests from CNC system 302, which NFU 304 uses to provision segments of an end-to-end fiber cross-connect at an interconnection facility.

Fiber cross-connect provisioning engine 314 may query and store service telemetry and analytics data (STAD) 316 in one or more data stores. STAD 316 may include metrics about the quantity, type, definition, and consumers of cross-connect services that are configured by fiber cross-connect provisioning engine 314. STAD 316 may include analytics information based on raw metrics data from NFU 304. For instance, analysis information of STAD 316 may include historical statistics and/or real-time statistics, which may be analyzed on various dimensions, such as consumer, service type, service use, to name only a few examples. PNP 3 may be used to configure multiple types of services other than cross-connect, in some examples.

CNC system 302 may also include financial logic 318. Financial logic 318 may store accounting information for customers. For instance, financial logic 318 may store billing information for customers, such as name, address, phone number, email, to name only a few examples. When fiber cross-connect provisioning engine 314 configures a fiber cross-connect service for a customer that includes a service charge, financial logic 318 may store such expense information. In this way, financial logic 318 may provide an accounting of services purchased by a customer and provide billing for such services.

CNC system 302 may include Information Technology (IT) gateway 320 that interfaces with IT systems 322. IT systems 322 may include one or more computing devices, such as desktop computers, tablets, smartphones, and servers, to name only a few examples. IT systems 322 may provide one or more user interfaces to administrators, which may use IT systems 322 to administer CNC system 302. IT systems 322 may, for example, receive user inputs to configure CNC system 302 and/or NFU 304. Based on the user inputs, IT systems 322 may send requests and/or instructions to CNC system 302, which are received by IT gateway 320. In some examples, CNC system 302 may provide or otherwise expose one or more RESTful interfaces that can be called or otherwise invoked by IT systems 322. IT gateway 320 may route such instructions or requests to other components within CNC system 302 for further processing based on the type of requests and/or instructions.

As described above, NFU 304 may receive requests or instructions from CNC system 302 to provision one or more cross-connect services. Optical fabric provisioning engine 324 may receive requests and/or instructions from fiber cross-connect provisioning engine 314. Optical fabric provisioning engine 324 may determine whether sufficient resources exist to satisfy a request for a fiber cross-connect service to be configured in the requisite interconnection facilities. In some examples, optical fabric provisioning engine 324 may query one or more components such as SDN controllers 306, hardware configurators 308, and/or optical fabric telemetry and analytics data (OFTAD) 326. If sufficient resources exist to provision a requested service, optical fabric provisioning engine 324 may send instructions and/or requests to one or more of SDN controller 306 and/or hardware configurators 308 to cause the requisite components to be configured to provision the requested service. As such, optical fabric provisioning engine 324 provides the functionality of selecting the vendor, and form factor in which the service is delivered. Optical fabric provisioning engine 324 also provides the policy manager functionality to ensure the service is delivered in the correct order of operation.

Optical fabric provisioning engine 324 may query and store optical switch fabric telemetry and analytics data (OFTAD) 326 in one or more data stores. OFTAD 326 may include metrics about the quantity, type, definition, of network, optical switch fabric, and resource configurations that are configured by NFU 304. OFTAD 326 may include analytics information from infrastructure data collectors 310 based on raw metrics data for resources used in a particular service. For instance, analysis information of OFTAD 326 may include historical statistics and/or real-time statistics. OFTAD 326 may further include data describing fiber usage in the optical switch fabric, such as those optical fibers and optical ports of photonic switches currently being used in an optical cross-connect.

As shown in FIG. 5, SDN controllers 306 may configure optical switch fabric resources, such as photonic switches, active panels, and the like, which provider the physical infrastructure for end-to-end fiber cross-connects to carry optical signals through interconnection facilities. In some cases, SDN controllers 306 may configure network resources, such as routers, switches, bridges, and the like, which provide the physical infrastructure to carry network traffic through an interconnection facility. Hardware configurators 308 may configure hardware resources, such as servers or the above-mentioned network and/or optical switch fabric resources; resources within servers and network resources including processor allocation, memory allocation; storage appliances; other hardware resources; and software configurations that may be configured to provision services to a customer. Infrastructure data collectors 310 may collect metrics about the quantity, type, definition, of network and resource configurations that are configured by NFU 304. For instance, infrastructure data collectors 310 may monitor and measure metrics of network and optical switch fabric resources and any other resources configured to provision services to a customer. Infrastructure data collectors 310 may store such metrics in OFTAD 326.

Programmable network platform 300 may in some examples represent an intelligent centralized service delivery and assurance system with the ability to have fault mitigation Monitor/Analyze/Plane/Execute (MAPE) loop, that will ensure the service delivered by the system is assured to adhere the service level agreement for the life cycle of the service. Programmable network platform 300 in some examples not only delivers services that can be offered by its own delivery infrastructure but also has the capability to communicate across other orchestration systems to deliver a combined homogeneous service. Programmable network platform 300, or more specifically CNC system 302, may be the central control center for both operations and business-related functions to be performed.

NFU 304 and CNC system 302 may also fulfill the need for having a distributed orchestration system for creating services and distributing the intelligence of delivering and assuring fiber cross-connect services. Programmable network platform 300 provides the advantage of providing a distributed, horizontally scaling architecture. CNC 302 and one or more NFUs 304 may provide the functionality of delivering and assuring a business service into two distinctly separate functions, (1) CNC—may handle the function of converting the business request into service parameters, (2) NFU—may handle the function of converting the service parameters into optical switch fabric parameters and instantiating the service.

Figure 6:
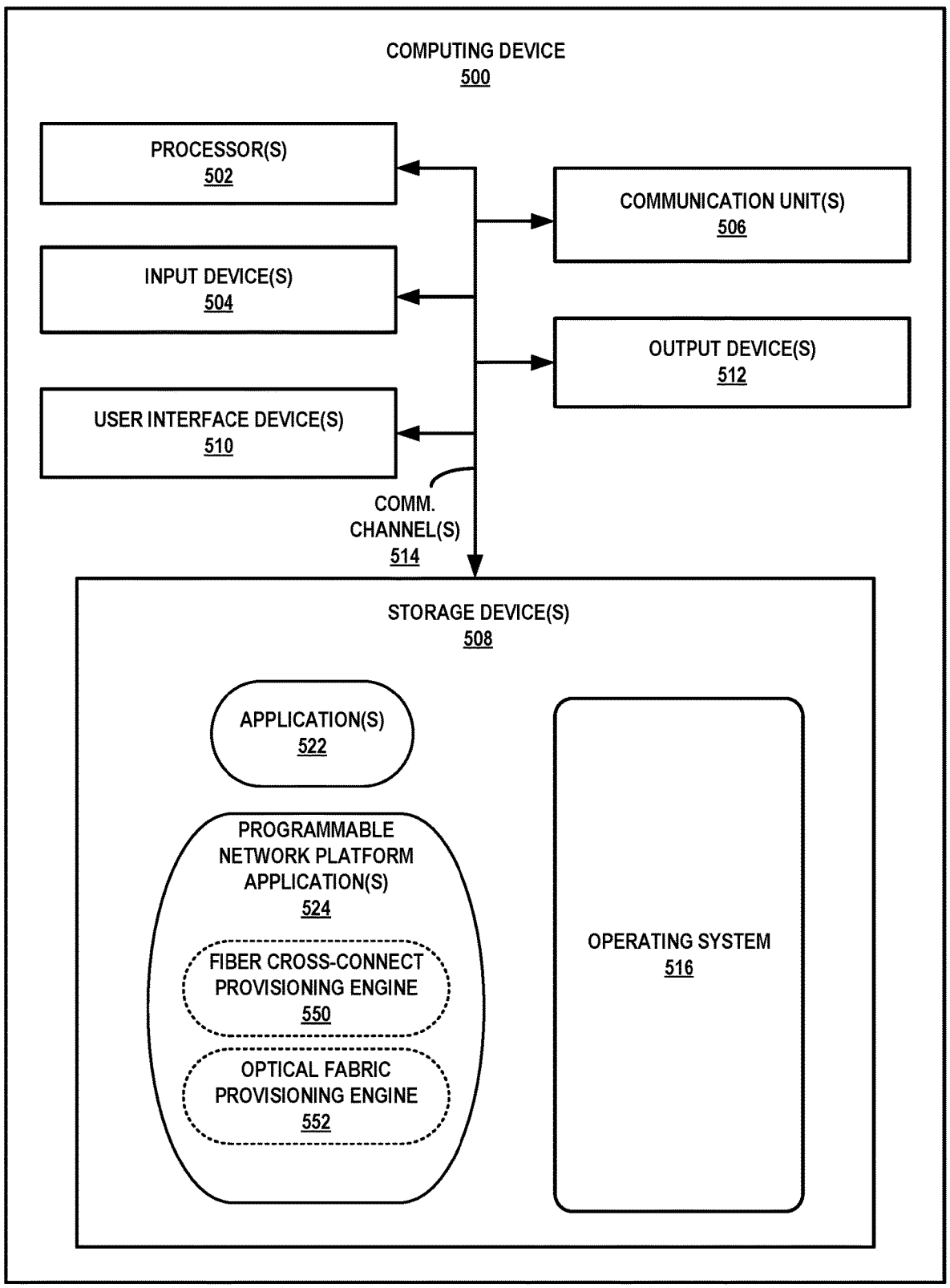
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 500 that includes one or more processor(s) 502 for executing programmable network platform applications 524, or any other computing device described herein. Other examples of computing device 500 may be used in other instances. Although shown in FIG. 6 as a stand-alone computing device 500 for purposes of example, programmable network platform applications 524 may be distributed among multiple computing devices on-prem, in a cloud, in a hybrid other deployment, and a computing device may be any component or system that includes one or more processors or other suitable computing environment for executing software instructions and, for example, need not necessarily include one or more elements shown in FIG. 6 (e.g., communication units 506; and in some examples components such as storage device(s) 508 may not be co-located or in the same chassis as other components).

As shown in the specific example of FIG. 6, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, programmable network platform application(s) 524 including fiber cross-connect provisioning engine 550 and optical fabric provisioning engine 552, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of microprocessors, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard disks, optical discs, floppy disks, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and programmable network platform application(s) 524 with processors 502, communication unit 506, storage device 508, input device 504, user interface devices 510, and output device 512.

Application 522 and programmable network platform application(s) 524 may also include program instructions and/or data that are executable by computing device 500. Example programmable network platform application(s) 524 executable by computing device 500 may include fiber cross-connect provisioning engine 550 and/or optical fabric provisioning engine 552, each illustrated with dashed lines to indicate that these may or may not be executable by any given example of computing device 500.

Fiber cross-connect provisioning engine 550 may include instructions for causing computing device 500 to perform one or more of the operations and actions described in the present disclosure with respect to fiber cross-connect provisioning engine 314. Optical fabric provisioning engine 552 may include instructions for causing computing device 500 to perform one or more of the operations and actions described in the present disclosure with respect to optical fabric provisioning engine 324.

Figure 7:
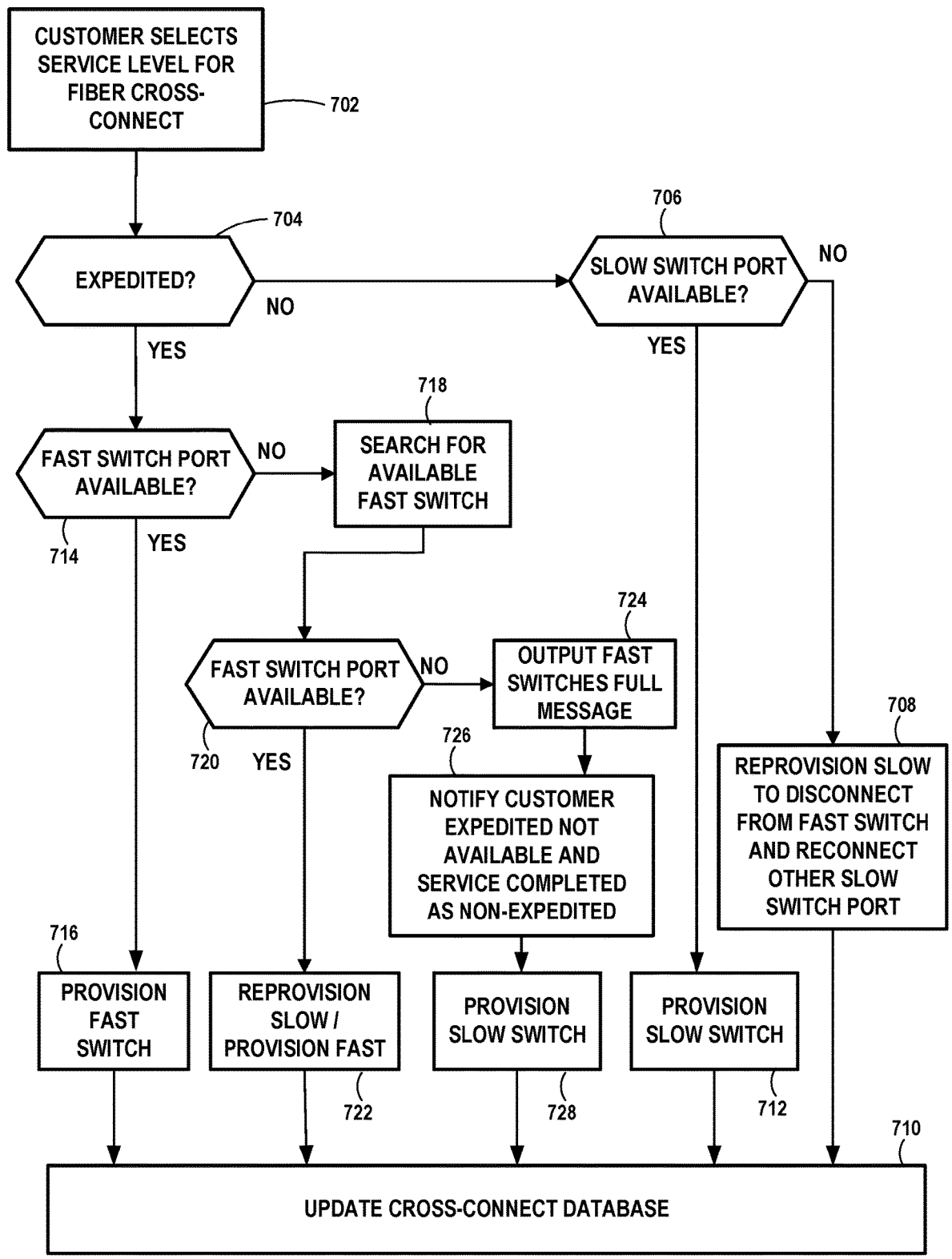
FIG. 7 is a flowchart illustrating an example mode of operation for providing fiber cross-connects with an interconnection system that includes a cascaded optical switch, in accordance with one or more aspects of the present disclosure.

FIG. 7 is a flowchart illustrating an example mode of operation for providing fiber cross-connects with an interconnection system that includes a cascaded optical switch, in accordance with one or more aspects of the present disclosure. FIG. 7 is described with reference to interconnection system 2 of FIGS. 1-3 but may be applicable to other examples of interconnection systems described in this disclosure.

A customer may request that a fiber cross-connected be provisioned at a selected interconnection service level, e.g., SLA <30 min or SLA <24 hour (702). PNP 3 may receive the request and determine if the selected/requested service level is expedited (e.g., SLA <30 min) or not (e.g., SLA <24 hour) (704). If the requested service is not expedited (the NO branch at 704), PNP 3 may determine whether a slow optical switch 16 port is available (706). If a port is not available (the NO branch at 706), PNP 3 may reprovision slow optical switch 16 to disconnect at least a port from a fast switch, e.g., an unused port provisioned to connect to a port pre-cabled to a fast optical switch (708). For example, a first number of ports of slow optical switch 16 may be pre-cabled to fast optical switches, a second number of ports of slow optical switch 16 may be configured to provision fiber cross-connects using the ports of the first number of ports, e.g., to switch between ports pre-cabled to the fast optical switches. A third number of ports of slow optical switch may be configured to provision fiber cross-connects using slow optical switch 16 only, e.g., between only ports of slow optical switch for SLA <24 hour. At (708), if all of the third number of ports are used, PNP 3 may release one of the second number of ports to be used as one of the ports of the third number of ports, e.g., to reconnect to another port of slow optical switch 16 (e.g., ports 26) rather than a port of slow optical switch pre-cabled to a fast optical switch (e.g., ports 22). In some examples, the customer may select a port at the same time as selecting/requesting a service level, e.g., non-expedited service (SLA <24 hour). The selected port may be pre-provisioned in slow optical switch 16 to be connected to an output port of slow optical switch 16 that is pre-cabled to a fast switch. PNP 3 may determine that the selected port is provisioned to be connected to a fast switch, and may reprovision the selected port within slow optical switch 16 to connect to a different output port of slow optical switch 16, e.g., satisfying the non-expedited service.

PNP 3 may in this way avoid unnecessarily tying up ports of a fast optical switch when the selected SLA does not require fast switching. In some examples, PNP 3 may determine configuration data for a fiber cross-connect based on the customer selection/request, port and switch availability of cascaded optical switch 10, and pre-cabling of the ports of cascaded optical switch 10, e.g., to customer spaces 4, and PNP 3 may send the configuration data to cascaded optical switch 10. Slow optical switch 16 may then receive the configuration data to modify a switching configuration to reconfigure a fiber cross-connect in the optical switch fabric that includes only slow switch 16, e.g., and does not include fast switches 12, 14 or ports of optical switch 16 pre-cabled to fast optical switches 12, 14. Slow optical switch 16 is thus provisioned with the fiber cross-connect in a manner that satisfies the currently selected/requested SLA <24 hour. PNP 3 may then update a cross-connection database, e.g., with port data of the reprovisioned ports (710).

However, if a slow switch port is available (YES branch at 706), PNP 3 does not need to reconfigure cascaded optical switch 10 to disconnect a port of a fast switch. PNP 3 may determine configuration data for a fiber cross-connect based on the customer selection/request, port and switch availability of cascaded optical switch 10, and pre-cabling of the ports of cascaded optical switch 10, e.g., to customer spaces 4, and PNP 3 may send the configuration data to slow optical switch 16 and fast optical switches 12, 14. Slow optical switch 16 may then receive the configuration data to modify a switching configuration to reconfigure a fiber cross-connect in the optical switch fabric that includes only slow switch 16, e.g., and does not include fast switches 12, 14 or ports of optical switch 16 pre-cabled to fast optical switches 12, 14. Slow optical switch 16 is thus provisioned with the fiber cross-connect (712) in a manner that satisfies the currently requested SLA <24 hour. PNP 3 may then update a cross-connection database, e.g., with port data of the reprovisioned ports (710).

If the requested fiber cross-connect service is to be expedited (the YES branch at 704), PNP 3 may determine whether a fast optical switch 12 port is available (714). If a port is available (the YES branch at 714), fast optical switch 12 will provision the fiber cross-connect (716). For example, PNP 3 may determine configuration data for a fiber cross-connect based on the customer request, port and switch availability of cascaded optical switch 10, and pre-cabling of the ports of cascaded optical switch 10, e.g., to customer spaces 4, and PNP 3 may send the configuration data to switches of cascaded optical switch 10. Slow optical switch 16 and/or fast optical switch 12 may then receive the configuration data to modify a switching configuration to reconfigure a fiber cross-connect in the optical switch fabric that includes fast optical switch 12 and that includes at least one of pre-cabled optical fiber 42A-42C and pre-cabled optical fibers 44A-44C. As described herein with respect to slow optical switches and fast optical switches, receiving the configuration data may cause the fast and/or slow optical switches to configure themselves to switch according to the received configuration date, e.g., to automatically provision connections between appropriate input and output ports per the received configuration data. Slow optical switch 16 and fast optical switch 12 are thus provisioned with the fiber cross-connect (716), e.g., fiber cross-connect 50, 60, or 70 in manner that satisfies the requested SLA <30 min. PNP 3 may then update a cross-connection database, e.g., with port data of the reprovisioned ports (710).

If a port of fast optical switch 12 is not available (the NO branch at 714), cascaded optical switch 10 will then search for an available fast switch (718), e.g., fast switch 14. PNP 3 may determine whether a port of fast optical switch 14 is available (720). If a port is available (the YES branch at 720), PNP 3 will provision the fiber cross-connect using slow optical switch 16 and fast optical switch 14 (722). For example, PNP 3 may determine configuration data for a fiber cross-connect based on the customer request, port and switch availability of cascaded optical switch 10, and pre-cabling of the ports of cascaded optical switch 10, e.g., to customer spaces 4, and PNP 3 may send the configuration data to slow optical switch 16 and/or fast optical switch 14, which modify a switching configuration to configure a fiber cross-connect in the optical switch fabric that includes fast optical switch 14 and that includes at least one of pre-cabled optical fibers 42D-42F and/or pre-cabled optical fibers 44D-44F. In some examples, PNP 3 may be configured to prioritize requests. For example, slow optical switch 16 may have a queue for requests and/or updating fiber cross-connects. A SLA <30 min fiber cross-connect request may have a high priority, and PNP 3 may send configuration data to slow optical switch 16 including the priority level and/or a command prioritizing the request within the queue for slow optical switch 16. Slow optical switch 16 and fast optical switch 14 are thus provisioned to implement the fiber cross-connect (720) in a manner that satisfies the requested SLA <30 min. PNP 3 may then update a cross-connection database, e.g., with port data of the reprovisioned ports (710).

If a port of fast optical switch 14 is not available (the NO branch at 720), PNP 3 will output a message indicating that no fast switches are available (724). The network operations center (NOC) may optionally notify the requesting customer that expedited SLA <30 min is not available and that cross-connection services will be completed as non-expedited (726), e.g., SLA <24 hour. Slow optical switch 16 may then provision the fiber cross-connect (728), e.g., as described above at (712).

Figure 8:
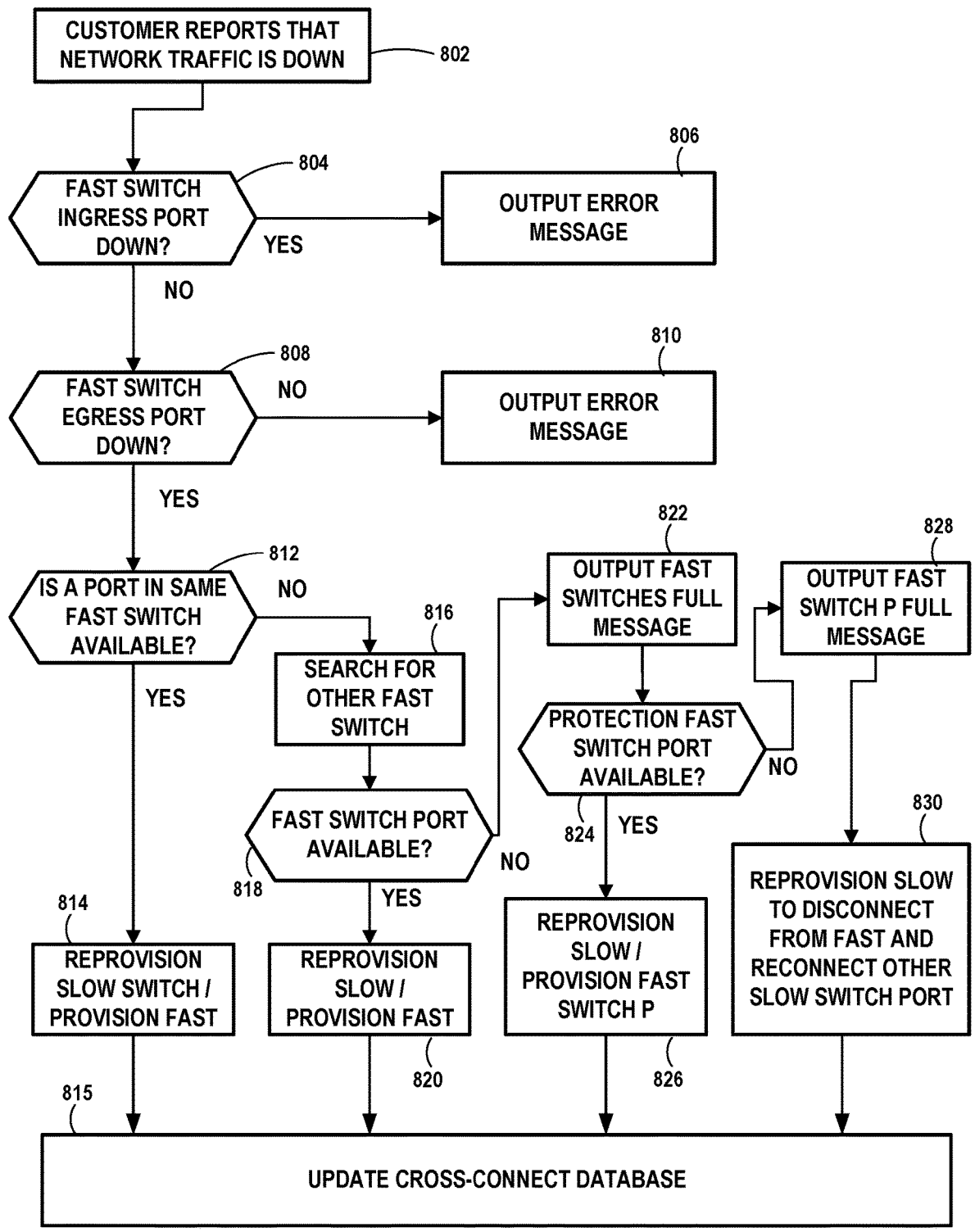
FIG. 8 is a flowchart illustrating another example mode of operation for providing fiber cross-connects with an interconnection system that includes a cascaded optical switch, in accordance with one or more aspects of the present disclosure.

FIG. 8 is a flowchart illustrating an example mode of operation for providing fiber cross-connects with an interconnection system that includes a cascaded optical switch, in accordance with one or more aspects of the present disclosure. FIG. 8 is described with reference to the interconnection system of FIG. 3 but may be applicable to other examples of interconnection systems described in this disclosure.

PNP 3 and may determine that network/signal/data traffic is down (802), e.g., that a port or fast optical switch is down and/or not functioning. In some examples, PNP 3 may receive a customer report (e.g., manually reported or automatically reported by a customer device) that network/signal/data traffic is down. PNP 3 may then determine whether a fast optical switch ingress port (804) is down or a fast optical switch egress port is down (808). If a fast optical switch ingress port is down (the YES branch at 804), PNP 3 may output an error message (806), and a network interconnection services operator may respond accordingly, e.g., to repair the port and/or switch. If a fast optical switch ingress port is not down (the NO branch at 804) and a fast optical switch egress port is not down (the NO branch at 808), PNP 3 may output an error message (810), and a network interconnection services operator may respond accordingly, e.g., to troubleshoot and/or determine that cause of the network/signal/data interruption.

If a fast optical switch ingress port is down (the YES branch at 808), PNP 3 may determine whether a port in the same fast optical switch is available (812). For example, PNP 3 may determine that port 32A of fiber cross-connect 60 provisioned by fast optical switch 12 is down at (808), and may determine that port 32B is available (the YES branch at 812). PNP 3 may determine configuration data for fiber cross-connect 62, and PNP 3 may send the configuration data to cascaded optical switch 10. Slow optical switch 16 and/or fast optical switch 12 may receive the configuration data to modify a switching configuration to reconfigure the fiber cross-connect in the optical switch fabric to be fiber cross-connect 62, e.g., including port 32B and at least one of pre-cabled fibers 42B and/or 44B. Slow optical switch 16 may then provision (or reprovision) the connection from port 20A to port 22B (814), and PNP 3 may then update a cross-connection database, e.g., with port data of the reprovisioned ports (815).

If a port of fast optical switch 12 is not available (the NO branch at 812), cascaded optical switch 10 will then search for an available fast switch (816), e.g., fast switch 14. PNP 3 may determine whether a fast optical switch 14 port is available (818). If a port is available (the YES branch at 818), slow optical switch 16 and fast optical switch 14 will provision the fiber cross-connect (820). PNP 3 may determine configuration data for a new fiber cross-connect, and PNP 3 may send the configuration data to cascaded optical switch 10. Slow optical switch 16 and/or fast optical switch 14 may receive the configuration data to modify a switching configuration to reconfigure the fiber cross-connect in the optical switch fabric to be fiber cross-connect in including fast optical switch 14 (not shown), e.g., including port 32C and at least one of pre-cabled fibers 42C and/or 44C or 44D. Slow optical switch 16 may then provision (or reprovision) the connection from port 20A to port 22C, and PNP 3 may then update a cross-connection database, e.g., with port data of the reprovisioned ports (815).

If a port of fast optical switch 14 is not available (the NO branch at 818), cascaded optical switch 10 may then output a fast switches are full message and/or notification (822) and PNP 3 may determine whether a fast optical switch P port is available (824). If a port is available (the YES branch at 824), slow optical switch 16 and fast optical switch P will provision the fiber cross-connect (826). PNP 3 may determine configuration data for fiber cross-connect 64, and PNP 3 may send the configuration data to cascaded optical switch 10. Slow optical switch 16 and/or fast optical switch P may receive the configuration data to modify a switching configuration to reconfigure fiber cross-connect 64 in the optical switch fabric to be a fiber cross-connect including fast optical switch P, e.g., including port 32X and at least one of pre-cabled fibers 42X and/or 44X or 44Y. Slow optical switch 16 may then provision (or reprovision) the connection from port 20A to port 22E, and PNP 3 may then update a cross-connection database, e.g., with port data of the reprovisioned ports (815).

If a port of fast optical switch P is not available (the NO branch at 824), cascaded optical switch 10 may then output a fast switches and/or protection fast switch are full message and/or notification (828) and PNP 3 may reprovision slow optical switch 16 to disconnect at least a port from a fast switch, e.g., an unused port provisioned to connect to a port pre-cabled to a fast optical switch (830), e.g., similar to (708) described above, and slow optical switch 16 may then provision fiber cross-connect 66, to connect port 20A to port 26B.

The following examples are described herein.

Example 1: A cascaded optical switch for an optical switch fabric of a data center, the cascaded optical switch including: a fast optical switch having input ports and output ports; a slow optical switch having input ports and output ports, wherein a switching time of the slow switch is longer than a switching time of the fast optical switch; a first pre-cabled optical fiber connecting a first port that is one of the output ports of the slow optical switch to a second port that is one of the input ports of the fast optical switch; and a second pre-cabled optical fiber connecting a third port that is one of the output ports of the fast optical switch to a fourth port that is one of the input ports of the slow optical switch, wherein the fast optical switch or the slow optical switch is configured to receive configuration data to modify a switching configuration to configure a fiber cross-connect in the optical switch fabric that includes at least one of the first pre-cabled optical fiber or the second pre-cabled optical fiber.

Example 2: The cascaded optical switch of example 1, wherein a plurality of pre-cabled optical fibers connect respective output ports of one or more customer spaces to respective input ports of the slow optical switch, wherein a number of input ports of the slow optical switch connected to an output port of a customer space is greater than a total number of input ports of the fast optical switch.

Example 3: The cascaded optical switch of example 1 or example 2, wherein a fifth port that is one of the input port of the slow optical switch is pre-cabled to a first output port of a first customer space, wherein a sixth port that is a different one of the input ports of the slow optical switch is pre-cabled to a second output port of a second customer space, wherein the configuration data configures the slow optical switch from switching from the fifth port to the first port to switching from the sixth port to the first port.

Example 4: The cascaded optical switch of any one of examples 1 through 3, wherein the fiber cross-connect is a first fiber cross-connect that includes at least one of the first pre-cabled optical fiber or the second pre-cabled optical fiber and has been requested to satisfy a first service level agreement having a first fiber cross connect reconfiguration speed, wherein the slow optical switch is configured to receive configuration data to modify a switching configuration to configure a second fiber cross-connect in the optical switch fabric that does not include either of the first pre-cabled optical fiber or the second pre-cabled optical fiber, wherein the second fiber cross-connect has been requested to satisfy a second service level agreement having a second fiber cross connect reconfiguration speed, wherein the first fiber cross connect reconfiguration speed is faster than the second fiber cross connect reconfiguration speed.

Example 5: The cascaded optical switch of example 4, further includes a third pre-cabled optical fiber connecting a fifth port that is one of the input ports of the slow optical switch to an output port of a customer space, wherein the first fiber cross-connect and the second fiber cross-connect include the third pre-cabled optical fiber.

Example 6: The cascaded optical switch of any one of examples 1 through 5, further includes a third pre-cabled optical fiber connecting a fifth port that is one of the output ports of the slow optical switch to a sixth port that is one of the input ports of the fast optical switch, wherein the fast optical switch or the slow optical switch is configured to receive the configuration data to modify the switching configuration to configure the fiber cross-connect in the optical switch fabric to include the third pre-cabled optical fiber and the second pre-cabled optical fiber.

Example 7: The cascaded optical switch of any one of examples 1 through 6, wherein the fast switch is a first fast switch, the cascaded optical switch further includes a second fast optical switch having input ports and output ports; and a third pre-cabled optical fiber connecting a fifth port that is one of the output ports of the slow optical switch to a sixth port that is one of the input ports of the second fast optical switch; a fourth pre-cabled optical fiber connecting a seventh port that is one of the output ports of the second fast optical switch to an eighth port that is one of the input ports of the slow optical switch; wherein the second fast optical switch or the slow optical switch is configured to receive configuration data to modify a switching configuration to configure a fiber cross-connect in the optical switch fabric that includes at least one of the third pre-cabled optical fiber or the fourth pre-cabled optical fiber.

Example 8: A method including: receiving, by a slow optical switch of a cascaded optical switch or by a fast optical switch of the cascaded optical switch, configuration data to modify a switching configuration to configure a fiber cross-connect in an optical switch fabric that includes at least one of a first pre-cabled optical fiber or a second pre-cabled optical fiber, wherein the fast optical switch comprises input ports and output ports, wherein the slow optical switch comprises input ports and output ports, wherein a switching time of the slow switch is longer than a switching time of the fast optical switch, wherein the first pre-cabled optical fiber connects a first port that is one of the output ports of the slow optical switch to a second port that is one of the input ports of the fast optical switch, wherein the second pre-cabled optical fiber connects a third port that is one of the output ports of the fast optical switch to a fourth port that is one of the input ports of the slow optical switch.

Example 9: The method of example 8, wherein a plurality of pre-cabled optical fibers connect respective output ports of one or more customer spaces to respective input port of the slow optical switch, wherein a number of input ports of the slow optical switch connected to an output port of a customer space is greater than a total number of input ports of the fast optical switch.

Example 10: The method of example 8 or example 9, wherein the fiber cross-connect includes a fifth port that is an input port of the slow optical switch that is pre-cabled to a first output port of a first customer space, the method further includes receiving, by the slow optical switch, the configuration data to modify a switching configuration to configure the fiber cross-connect in the optical switch fabric to include a sixth port that is a different input port of the slow optical switch from the fifth port, wherein the sixth port is pre-cabled to a second output port of a second customer space, wherein the configuration data configures the slow optical switch from switching from the fifth port to the first port to switching from the sixth port to the first port.

Example 11: The method of any one of examples 8 through 10, wherein the fiber cross-connect is a first fiber cross-connect that includes at least one of the first pre-cabled optical fiber or the second pre-cabled optical fiber and has been requested to satisfy a first service level agreement having a first fiber cross connect reconfiguration speed, the method further including: receiving, by the slow optical switch, configuration data to modify the switching configuration to configure a second fiber cross-connect in the optical switch fabric that does not include either of the first pre-cabled optical fiber or the second pre-cabled optical fiber, wherein the second fiber cross-connect has been requested to satisfy a second service level agreement having a second fiber cross-connect reconfiguration speed, wherein the first fiber cross connect reconfiguration speed is faster than the second fiber cross connect reconfiguration speed; and switching, by the slow optical switch, between provisioning the first fiber cross-connect and the second fiber cross-connect.

Example 12: The method of example 11, wherein a first portion of the input ports of the slow switch are provisioned to connect to an input port of the fast optical switch, wherein a second portion of the input ports of the slow optical switch are provisioned to connect to an output port of the slow optical switch, the method further includes determining, prior to switching between provisioning the first fiber cross-connect and the second fiber cross-connect, that an input port of the second portion of input ports is not available; reprovisioning a fifth port that is an input port of the first portion of input ports of the slow optical switch to connect to one of the output ports of the slow optical switch; and configuring the second fiber cross-connect to include the fifth port.

Example 13: The method of any one of examples 8 through 12, wherein the fast optical switch is a first fast optical switch, the method further including: determining, prior to provisioning the slow optical switch and the fast optical switch, that the second port is not available; determining that a fifth port that is an input port of a second fast optical switch comprising input ports and output ports is available; and reprovisioning the slow optical switch to configure the fiber cross-connect to include a third pre-cabled optical fiber or a fourth pre-cabled optical fiber, wherein the switching time of the slow optical switch is longer than a switching time of the second fast optical switch, wherein the third pre-cabled optical fiber connects a fifth port that is one of the output ports of the slow optical switch to a sixth port that is one of the input ports of the fast optical switch, and wherein the fourth pre-cabled optical fiber connects a seventh port that is one of the output ports of the fast optical switch to an eighth port that is one of the input ports of the slow optical switch.

Example 14: The method of any one of examples 8 through 13, the method further including: determining that the second port or the third port is not functioning; if the second port is not functioning, determining that a fifth port that is one of the input ports of the fast optical switch is available, wherein the fifth port is connected to a sixth port that is one of the output ports of the slow optical switch by a third pre-cabled optical fiber; if the third port is not functioning, determining that a seventh port that is one of the output ports of the fast optical switch is available, wherein the seventh port is connected to an eighth port that is one of the input ports of the slow optical switch by a fourth pre-cabled optical fiber; receiving, by the slow optical switch or the fast optical switch, configuration data to modify the switching configuration to configure the fiber cross-connect in the optical switch fabric that includes the third pre-cabled optical fiber if the second port is not functioning or the fourth pre-cabled optical fiber if the third port is not functioning; and provisioning the slow optical switch and the fast optical switch according to the received configuration data to configure the fiber cross-connect to include at least one of the third pre-cabled optical fiber or the fourth pre-cabled optical fiber.

Example 15: The method of any one of examples 8 through 14, wherein the fast optical switch is a first fast optical switch, the method further including: determining that the second port or the third port is not functioning; determining that a fifth port that is an input port of a second fast optical switch is available, wherein the fifth port is connected to a sixth port that is one of the output ports of the slow optical switch by a third pre-cabled optical fiber, wherein a seventh port that is one of the output ports of the second fast optical switch is connected to an eighth port that is one of the input ports of the slow optical switch by a fourth pre-cabled optical fiber; receiving, by the slow optical switch or the fast optical switch, configuration data to modify the switching configuration to configure the fiber cross-connect in the optical switch fabric that includes at least one of the third pre-cabled optical fiber or the fourth pre-cabled optical fiber; and provisioning the slow optical switch and the fast optical switch according to the received configuration data to configure the fiber cross-connect to include at least one of the third pre-cabled optical fiber or the second pre-cabled optical fiber.

Example 16: The method of any one of examples 8 through 15, further including: determining that the second port or the third port is not functioning; determining that no input ports of the fast optical switch are available; receiving, by the slow optical switch or the fast optical switch, configuration data to modify the switching configuration to configure the fiber cross-connect in the optical switch fabric to not include the first pre-cabled optical fiber or the second pre-cabled optical fiber; and switching, by the slow optical switch, to provision the fiber cross-connect to not include the first pre-cabled optical fiber or the second pre-cabled optical fiber.

Example 17: A system including: a programmable network platform configured to determine configuration data to modify a switching configuration to configure a fiber cross-connect in an optical switch fabric; and a cascaded optical switch for an optical switch fabric of a data center, the cascaded optical switch including: a fast optical switch having input ports and output ports; a slow optical switch having input ports and output ports, wherein a switching time of the slow switch is longer than a switching time of the fast optical switch; a first pre-cabled optical fiber connecting a first port that is one of the output ports of the slow optical switch to a second port that is one of the input ports of the fast optical switch; and a second pre-cabled optical fiber connecting a third port that is one of the output ports of the fast optical switch to a fourth port that is one of the input ports of the slow optical switch, wherein the fast optical switch or the slow optical switch is configured to receive the configuration data from the programmable network platform to modify the switching configuration to configure the fiber cross-connect in the optical switch fabric that includes at least one of the first pre-cabled optical fiber or the second pre-cabled optical fiber.

Example 18: The system of example 17, wherein the programmable network platform is configured to determine the configuration data based on a customer request for the fiber cross-connect at a first service level agreement having a first fiber cross connect reconfiguration speed or at a second service level agreement having a second fiber cross connect reconfiguration speed, wherein the first fiber cross connect reconfiguration speed is faster than the second fiber cross connect reconfiguration speed.

Example 19: The system of example 17 or example 18, further comprising a plurality of pre-cabled optical fibers each connecting an output port of one or more customer spaces to a different input port of the slow optical switch, wherein a number of input ports of the slow optical switch connected to an output port of a customer space is greater than a total number of input ports of the fast optical switch.

Example 20: The system of any one of examples 17 through 19, wherein a fifth port that is an input port of the slow optical switch is pre-cabled to a first output port of a first customer space, wherein a sixth port that is a different input port of the slow optical switch is pre-cabled to a second output port of a second customer space, wherein the slow optical switch is configured to switch between connecting the fifth port and first port and connecting the sixth port and the first port.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A cascaded optical switch for an optical switch fabric of a data center, the cascaded optical switch comprising:
   a fast optical switch having input ports and output ports;
   a slow optical switch having input ports and output ports, wherein a switching time of the slow switch is longer than a switching time of the fast optical switch;
   a first pre-cabled optical fiber connecting a first port that is one of the output ports of the slow optical switch to a second port that is one of the input ports of the fast optical switch; and
   a second pre-cabled optical fiber connecting a third port that is one of the output ports of the fast optical switch to a fourth port that is one of the input ports of the slow optical switch,
   wherein at least one of the fast optical switch or the slow optical switch is configured to receive configuration data to modify a switching configuration to configure a fiber cross-connect in the optical switch fabric that includes at least one of the first pre-cabled optical fiber or the second pre-cabled optical fiber, wherein the configuration data causes the fast optical switch to switch data received at the second port to the third port.

2. The cascaded optical switch of claim 1, wherein a plurality of pre-cabled optical fibers connect respective output ports of one or more customer spaces to respective input ports of the slow optical switch, wherein a number of input ports of the slow optical switch connected to an output port of a customer space is greater than a total number of input ports of the fast optical switch.

3. The cascaded optical switch of claim 1, wherein a fifth port that is one of the input ports of the slow optical switch is pre-cabled to a first output port of a first customer space, wherein a sixth port that is a different one of the input ports of the slow optical switch is pre-cabled to a second output port of a second customer space, wherein the configuration data configures the slow optical switch from switching from the fifth port to the first port to switching from the sixth port to the first port.

4. The cascaded optical switch of claim 1,
wherein the fiber cross-connect is a first fiber cross-connect that includes at least one of the first pre-cabled optical fiber or the second pre-cabled optical fiber and has been requested to satisfy a first service level agreement having a first fiber cross connect reconfiguration speed,
wherein the slow optical switch is configured to receive configuration data to modify a switching configuration to configure a second fiber cross-connect in the optical switch fabric that does not include either of the first pre-cabled optical fiber or the second pre-cabled optical fiber, wherein the second fiber cross-connect has been requested to satisfy a second service level agreement having a second fiber cross connect reconfiguration speed,
wherein the first fiber cross connect reconfiguration speed is faster than the second fiber cross connect reconfiguration speed.

5. The cascaded optical switch of claim 4, further comprising:
a third pre-cabled optical fiber connecting a fifth port that is one of the input ports of the slow optical switch to an output port of a customer space, wherein the first fiber cross-connect and the second fiber cross-connect include the third pre-cabled optical fiber.

6. The cascaded optical switch of claim 1, further comprising:
a third pre-cabled optical fiber connecting a fifth port that is one of the output ports of the slow optical switch to a sixth port that is one of the input ports of the fast optical switch,
wherein the fast optical switch or the slow optical switch is configured to receive the configuration data to modify the switching configuration to configure the fiber cross-connect in the optical switch fabric to include the third pre-cabled optical fiber and the second pre-cabled optical fiber.

7. The cascaded optical switch of claim 1, wherein the fast switch is a first fast switch, the cascaded optical switch further comprising:
a second fast optical switch having input ports and output ports; and
a third pre-cabled optical fiber connecting a fifth port that is one of the output ports of the slow optical switch to a sixth port that is one of the input ports of the second fast optical switch;
a fourth pre-cabled optical fiber connecting a seventh port that is one of the output ports of the second fast optical switch to an eighth port that is one of the input ports of the slow optical switch;
wherein the second fast optical switch or the slow optical switch is configured to receive configuration data to modify a switching configuration to configure a fiber cross-connect in the optical switch fabric that includes at least one of the third pre-cabled optical fiber or the fourth pre-cabled optical fiber.

8. A method comprising:
receiving, by at least one of a slow optical switch of a cascaded optical switch or by a fast optical switch of the cascaded optical switch, configuration data to modify a switching configuration to configure a fiber cross-connect in an optical switch fabric that includes at least one of a first pre-cabled optical fiber or a second pre-cabled optical fiber,
wherein the fast optical switch comprises input ports and output ports,
wherein the slow optical switch comprises input ports and output ports, wherein a switching time of the slow switch is longer than a switching time of the fast optical switch,
wherein the first pre-cabled optical fiber connects a first port that is one of the output ports of the slow optical switch to a second port that is one of the input ports of the fast optical switch,
wherein the second pre-cabled optical fiber connects a third port that is one of the output ports of the fast optical switch to a fourth port that is one of the input ports of the slow optical switch; and
switching, by the fast optical switch, based on the configuration data, data received at the second port to the third port.

9. The method of claim 8, wherein a plurality of pre-cabled optical fibers connect respective output ports of one or more customer spaces to respective input port of the slow optical switch, wherein a number of input ports of the slow optical switch connected to an output port of a customer space is greater than a total number of input ports of the fast optical switch.

10. The method of claim 8, wherein the fiber cross-connect includes a fifth port that is an input port of the slow optical switch that is pre-cabled to a first output port of a first customer space, the method further comprising:
receiving, by the slow optical switch, the configuration data to modify a switching configuration to configure the fiber cross-connect in the optical switch fabric to include a sixth port that is a different input port of the slow optical switch from the fifth port, wherein the sixth port is pre-cabled to a second output port of a second customer space,
wherein the configuration data configures the slow optical switch from switching from the fifth port to the first port to switching from the sixth port to the first port.

11. The method of claim 8, wherein the fiber cross-connect is a first fiber cross-connect that includes at least one of the first pre-cabled optical fiber or the second pre-cabled optical fiber and has been requested to satisfy a first service level agreement having a first fiber cross connect reconfiguration speed, the method further comprising:
receiving, by the slow optical switch, configuration data to modify the switching configuration to configure a second fiber cross-connect in the optical switch fabric that does not include either of the first pre-cabled optical fiber or the second pre-cabled optical fiber, wherein the second fiber cross-connect has been requested to satisfy a second service level agreement having a second fiber cross-connect reconfiguration speed, wherein the first fiber cross connect reconfiguration speed is faster than the second fiber cross connect reconfiguration speed; and
switching, by the slow optical switch, between provisioning the first fiber cross-connect and the second fiber cross-connect.

12. The method of claim 11, wherein a first portion of the input ports of the slow switch are provisioned to connect to an input port of the fast optical switch, wherein a second portion of the input ports of the slow optical switch are provisioned to connect to an output port of the slow optical switch, the method further comprising:

determining, prior to switching between provisioning the first fiber cross-connect and the second fiber cross-connect, that an input port of the second portion of input ports is not available;

reprovisioning a fifth port that is an input port of the first portion of input ports of the slow optical switch to connect to one of the output ports of the slow optical switch; and configuring the second fiber cross-connect to include the fifth port.

13. The method of claim 8, wherein the fast optical switch is a first fast optical switch, the method further comprising:

determining, prior to provisioning the slow optical switch and the fast optical switch, that the second port is not available;

determining that a fifth port that is an input port of a second fast optical switch comprising input ports and output ports is available; and reprovisioning the slow optical switch to configure the fiber cross-connect to include a third pre-cabled optical fiber or a fourth pre-cabled optical fiber, wherein the switching time of the slow optical switch is longer than a switching time of the second fast optical switch, wherein the third pre-cabled optical fiber connects a fifth port that is one of the output ports of the slow optical switch to a sixth port that is one of the input ports of the fast optical switch, and wherein the fourth pre-cabled optical fiber connects a seventh port that is one of the output ports of the fast optical switch to an eighth port that is one of the input ports of the slow optical switch.

14. The method of claim 8, further comprising:

determining that the second port or the third port is not functioning;

if the second port is not functioning, determining that a fifth port that is one of the input ports of the fast optical switch is available, wherein the fifth port is connected to a sixth port that is one of the output ports of the slow optical switch by a third pre-cabled optical fiber;

if the third port is not functioning, determining that a seventh port that is one of the output ports of the fast optical switch is available, wherein the seventh port is connected to an eighth port that is one of the input ports of the slow optical switch by a fourth pre-cabled optical fiber;

receiving, by the slow optical switch or the fast optical switch, configuration data to modify the switching configuration to configure the fiber cross-connect in the optical switch fabric that includes the third pre-cabled optical fiber if the second port is not functioning or the fourth pre-cabled optical fiber if the third port is not functioning; and provisioning the slow optical switch and the fast optical switch according to the received configuration data to configure the fiber cross-connect to include at least one of the third pre-cabled optical fiber or the fourth pre-cabled optical fiber.

15. The method of claim 8, wherein the fast optical switch is a first fast optical switch, the method further comprising:

determining that the second port or the third port is not functioning;

determining that a fifth port that is an input port of a second fast optical switch is available, wherein the fifth port is connected to a sixth port that is one of the output ports of the slow optical switch by a third pre-cabled optical fiber, wherein a seventh port that is one of the output ports of the second fast optical switch is connected to an eighth port that is one of the input ports of the slow optical switch by a fourth pre-cabled optical fiber;

receiving, by the slow optical switch or the fast optical switch, configuration data to modify the switching configuration to configure the fiber cross-connect in the optical switch fabric that includes at least one of the third pre-cabled optical fiber or the fourth pre-cabled optical fiber; and provisioning the slow optical switch and the fast optical switch according to the received configuration data to configure the fiber cross-connect to include at least one of the third pre-cabled optical fiber or the second pre-cabled optical fiber.

16. The method of claim 8, further comprising:

determining that the second port or the third port is not functioning;

determining that no input ports of the fast optical switch are available;

receiving, by the slow optical switch or the fast optical switch, configuration data to modify the switching configuration to configure the fiber cross-connect in the optical switch fabric to not include the first pre-cabled optical fiber or the second pre-cabled optical fiber; and switching, by the slow optical switch, to provision the fiber cross-connect to not include the first pre-cabled optical fiber or the second pre-cabled optical fiber.

17. A system comprising:

a programmable network platform configured to determine configuration data to modify a switching configuration to configure a fiber cross-connect in an optical switch fabric; and a cascaded optical switch for an optical switch fabric of a data center, the cascaded optical switch comprising:

a fast optical switch having input ports and output ports;

a slow optical switch having input ports and output ports, wherein a switching time of the slow switch is longer than a switching time of the fast optical switch;

a first pre-cabled optical fiber connecting a first port that is one of the output ports of the slow optical switch to a second port that is one of the input ports of the fast optical switch; and a second pre-cabled optical fiber connecting a third port that is one of the output ports of the fast optical switch to a fourth port that is one of the input ports of the slow optical switch, wherein at least one of the fast optical switch or the slow optical switch is configured to receive the configuration data from the programmable network platform to modify the switching configuration to configure the fiber cross-connect in the optical switch fabric that includes at least one of the first pre-cabled optical fiber or the second pre-cabled optical fiber, wherein the configuration data causes the fast optical switch to switch data received at the second port to the third port.

18. The system of claim 17, wherein the programmable network platform is configured to determine the configuration data based on a customer request for the fiber cross-connect at a first service level agreement having a first fiber cross connect reconfiguration speed or at a second service level agreement having a second fiber cross connect reconfiguration speed, wherein the first fiber cross connect reconfiguration speed is faster than the second fiber cross connect reconfiguration speed.

19. The system of claim 17, further comprising a plurality of pre-cabled optical fibers each connecting an output port of one or more customer spaces to a different input port of the slow optical switch, wherein a number of input ports of the slow optical switch connected to an output port of a customer space is greater than a total number of input ports of the fast optical switch.

20. The system of claim 17, wherein a fifth port that is an input port of the slow optical switch is pre-cabled to a first output port of a first customer space, wherein a sixth port that is a different input port of the slow optical switch is pre-cabled to a second output port of a second customer space, wherein the slow optical switch is configured to switch between connecting the fifth port and first port and connecting the sixth port and the first port.

* * * * *